United States Patent
Lyu et al.

(10) Patent No.: US 10,088,887 B2
(45) Date of Patent: Oct. 2, 2018

(54) CENTRAL CONTROL APPARATUS FOR CONTROLLING FACILITIES, FACILITY CONTROL SYSTEM COMPRISING THE SAME, AND FACILITY CONTROL METHOD

(71) Applicant: LG ELECTRONICS INC., Seoul (KR)

(72) Inventors: Junghwan Lyu, Seoul (KR); Heekyung Kim, Seoul (KR); Wookjin Park, Seoul (KR); Soyeon Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 304 days.

(21) Appl. No.: 14/875,245

(22) Filed: Oct. 5, 2015

(65) Prior Publication Data

US 2016/0103442 A1 Apr. 14, 2016

(30) Foreign Application Priority Data

Oct. 10, 2014 (KR) .......................... 10-2014-0136899

(51) Int. Cl.
*G05D 3/12* (2006.01)
*G06F 1/32* (2006.01)
*G05B 15/02* (2006.01)

(52) U.S. Cl.
CPC ........... *G06F 1/3206* (2013.01); *G05B 15/02* (2013.01); *G05B 2219/2639* (2013.01); *G05B 2219/2642* (2013.01)

(58) Field of Classification Search
CPC .................................................... G06F 1/3206

(Continued)

(56) References Cited

U.S. PATENT DOCUMENTS 8,700,224 B2* 4/2014 Mathiowetz .............. H02J 3/14
307/85
2008/0281473 A1* 11/2008 Pitt ......................... G06Q 30/02
700/291

(Continued)

FOREIGN PATENT DOCUMENTS

JP 2007-057139 A 3/2007
KR 10-2014-0062367 5/2014
KR 10-1448453 10/2014

OTHER PUBLICATIONS

Tamarkin, Tom D. "Automatic meter reading." Public Power 50.5 (1992): pp. 934-937.*

(Continued)

*Primary Examiner* — Satish Rampuria
(74) *Attorney, Agent, or Firm* — Ked & Associates, LLP

(57) ABSTRACT

A central control apparatus may include a controller that includes a control program that when executed collecting data to obtain predicted environmental data including weather information about a target control area, setting information based on the collect data about at least one facility within the target control area, and simulating energy usage to generate a facility model based on the collected data of the at least one facility information and simulating power consumption of the facility model according to a control scenario. Additionally, the simulating of the energy usage may include determining energy reduction of the facility or target control area based on a simulation result of the power consumption of the facility model according to a combination of at least one control scenario, and determining the combination of at least one control scenario based on the energy reduction rate input through the input unit.

13 Claims, 19 Drawing Sheets

(58) Field of Classification Search
USPC .................................................. 700/275–306
See application file for complete search history.

(56) References Cited

U.S. PATENT DOCUMENTS

| | | | | |
|---|---|---|---|---|
| 2010/0235144 | A1* | 9/2010 | Mosberger-Tang | G01D 4/004 702/188 |
| 2012/0053740 | A1* | 3/2012 | Venkatakrishnan | G06F 1/3203 700/291 |
| 2012/0179547 | A1* | 7/2012 | Besore | G06Q 30/0261 705/14.58 |
| 2012/0310416 | A1* | 12/2012 | Tepper | G05B 15/00 700/276 |
| 2013/0018843 | A1* | 1/2013 | Bultman | G06F 17/00 707/609 |

OTHER PUBLICATIONS

Sackinger, Eduard, et al. "A 15-mW, 155-Mb/s CMOS burst-mode laser driver with automatic power control and end-of-life detection." IEEE Journal of Solid-State Circuits 34.12 (1999): pp. 1944-1950.*

Atif, Morad R., and Anca D. Galasiu. "Energy performance of daylight-linked automatic lighting control systems in large atrium spaces: report on two field-monitored case studies." Energy and Buildings 35.5 (2003): pp. 441-461.*

Korean Office Action for Application 10-2014-0136899 dated Sep. 22, 2015.

* cited by examiner

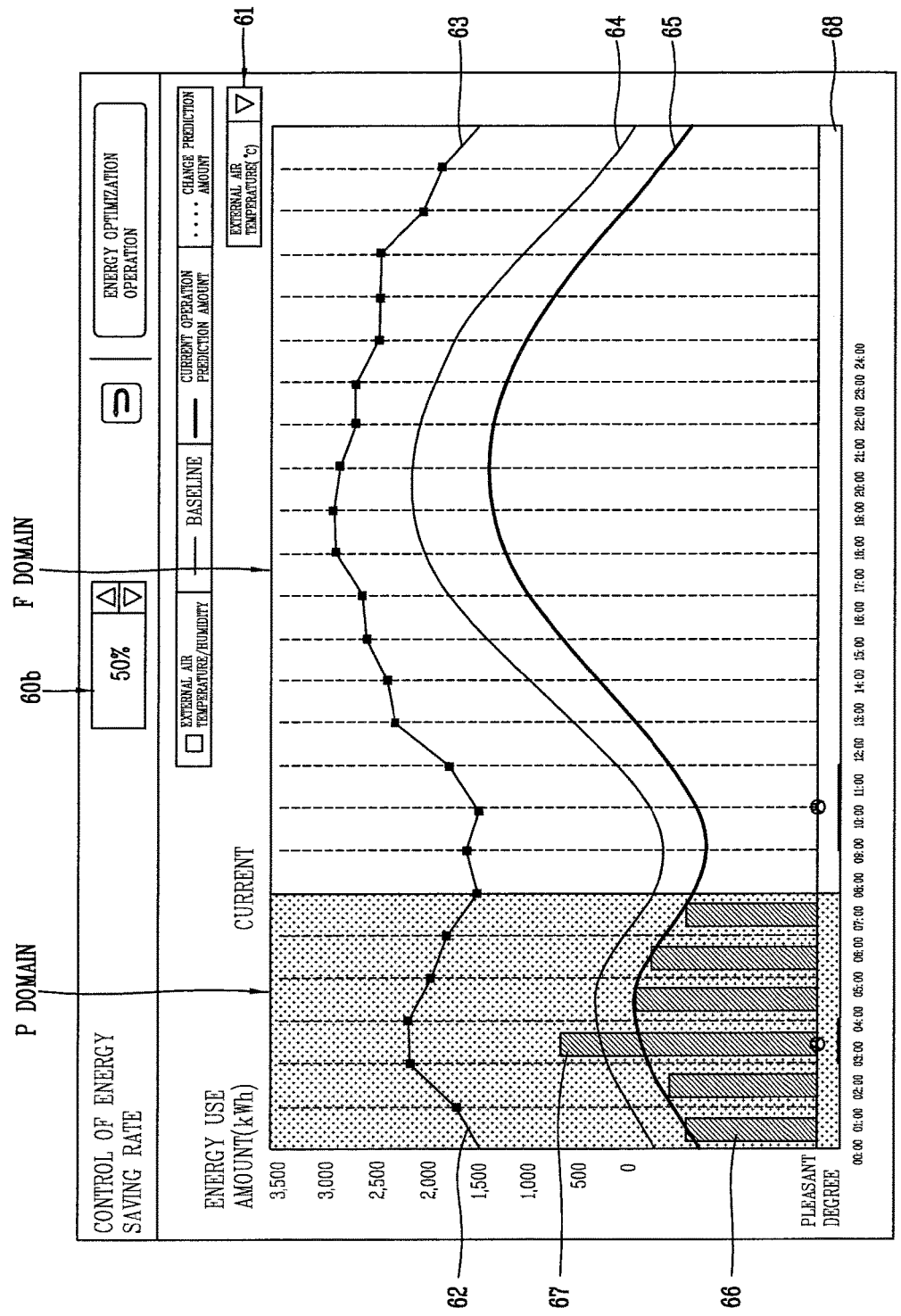

CENTRAL CONTROL APPARATUS FOR CONTROLLING FACILITIES, FACILITY CONTROL SYSTEM COMPRISING THE SAME, AND FACILITY CONTROL METHOD

CROSS-REFERENCE TO RELATED APPLICATION

This application claims priority under 35 U.S.C. § 119 to Korean Application No. 10-2014-0136899 filed on Oct. 10, 2014, whose entire disclosure is hereby incorporated by reference.

BACKGROUND

1. Field

The present invention relates to a central control apparatus for controlling facilities, a facility control system, and a facility control method, and more particularly, to a central control apparatus capable of simulating the power consumption of facilities, a facility control system, and a facility control method.

2. Background

With the recent modernization of facilities in buildings, automated control systems for the automated control of facilities like electricity, lighting, air-conditioning, disaster prevention, crime prevention, etc. are becoming common. That is, facility control systems that allow for integrated management of facilities are now being developed actively.

In general, a facility control system may be configured based on a monitoring point for control or monitoring, which is commonly called a control point. Thus, the user may establish a single or several control points for a single facility or equipment, and may perform monitoring, control, etc. on that facility using values of the control point. Therefore, the user may establish a corresponding control point depending on the type and shape of a facility installed in a building, and register it in the facility control system for the automated control of the building.

Conventionally, in the case of energy-saving control over a facility or equipment controlled by a central control apparatus, an expert analyzes facility or equipment operational data collected from the control point for a predetermined period of time (usually, a minimum of three months and up to a year), and create a control scenario for that facility or equipment using the analysis result.

The operation of the facility or equipment is controlled according to the control scenario created by the expert, and the expert checks whether or how much energy is saved based on the control result.

As energy-saving control over facilities or equipment depends on the expert's experience or capability, the presence or level of any energy saving effect for each facility or equipment cannot be kept constant, and it takes a long time to create a control scenario for energy-saving control.

To solve this problem, there is an urgent need for necessary technologies.

BRIEF DESCRIPTION OF THE DRAWINGS

The embodiments will be described in detail with reference to the following drawings in which like reference numerals refer to like elements wherein:

FIGS. 7A, 7B, 7C and 7D are views illustrating an example of a screen displayed by the central control apparatus according to an exemplary embodiment of the present invention;

DETAILED DESCRIPTION

Figure 1:
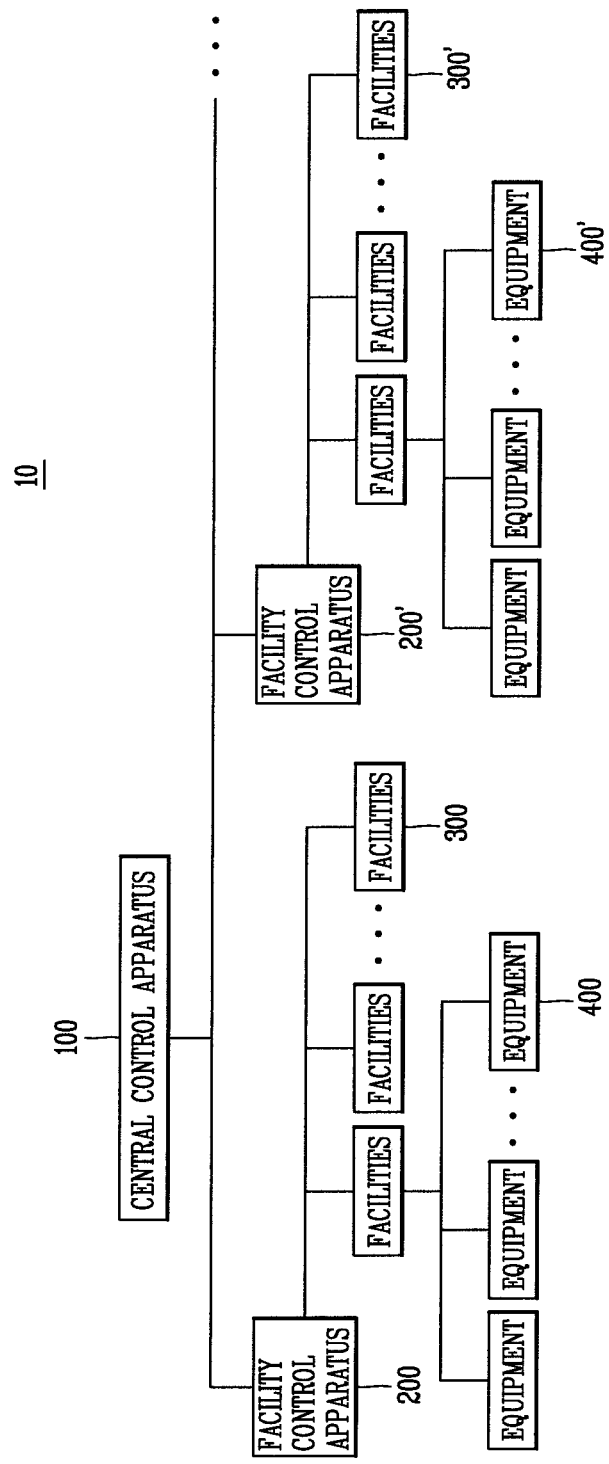
FIG. 1 is a block diagram of the configuration of a facility control system according to an exemplary embodiment of the present invention.

The technologies disclosed in this specification are applicable to a central control apparatus (or central control server) for controlling facilities and a facility control system comprising the same.

Herein, a facility control system may be a building automation system that is set up in a building for the control of facilities installed in that building. Especially, the facility control system may be a building management system (BMS). That is, the building automation system is a concept that includes a factory automation system, without being limited to a particular type of automation system. In this specification, the building automation system may be a building automation system, particularly for controlling facilities installed in a building.

Also, the facility control system may be a building energy management system (BEMS) used to maintain a pleasant indoor environment and increase energy performance by providing the energy management of facilities installed in a building.

The technologies disclosed in this specification can also be applied to a facility control method for controlling facilities installed in a building and a facility control system for providing a user interface (UI) for efficient and easy control of the facilities. Especially, the user interface may be provided by a particular apparatus, for example, a central control apparatus (or central control server), included in the facility control system.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

It will be understood that although the terms first, second, etc. may be used herein to describe various elements, these elements should not be limited by these terms. These terms are generally only used to distinguish one element from another.

Preferred embodiments of the present invention will be explained with reference to the attached drawings. The same or similar components will be provided with the same or similar reference numerals, and explanations thereof will be omitted.

If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Facility Control System

FIG. 1 is a block diagram of the configuration of a facility control system according to an exemplary embodiment of the present invention.

As shown in FIG. 1, the facility control system 10 according to an exemplary embodiment of the present invention includes a central control apparatus 100 and facility control apparatuses 200 and 200' connected to the central control apparatus via a communication network, and may further include one or more facilities 300 and 300' or equipment 400 and 400'.

The central control apparatus 100 registers one or more control points for the one or more facilities 300 and 300' or equipment 400 or 400', and control the facilities or equipment by using the control points.

The central control apparatus 100 has one or more stations (or 'virtual servers') created by registering at least some of the control points, and each station may be configured to control the facilities for the registered control points in response to a control command entered by the user.

The facilities 300 and 300' are sub-systems constituting the facility control system 10, and for example, may refer to air-conditioning, ventilation, fans, a boiler, a cooling tower, a pump, temperature/humidity sensors, a freezer, lighting, a fire prevention system, and so on.

If the facilities 300 and 300' include a cooling tower system, the equipment 400 and 400' may refer to a cooling tower, a pump, a chiller, a temperature sensor, etc.

The central control apparatus 100 is an apparatus that controls and/or monitors the entire building's situation, and may have a terminal for the facilities 300 and 300', for example, mechanical facilities, lighting, electricity, access control, disaster prevention, parking management, facilities management, etc.

The central control apparatus 100 may be an automation server that shares information with the facility control apparatus 200 over a network and controls or monitors the facilities 300 and 300' and the equipment 400 and 400' included in the facilities 300 and 300' through the control points.

Generally, the central control apparatus 100 may register one or more preset control points for the facilities 300 and 300' or the equipment 400 and 400', and create a control program for operating the facilities 300 and 300' or the equipment 400 and 400', through the control points.

The central control apparatus 100 may control and/or monitor the facilities 300 and 300' by using the control program.

According to an exemplary embodiment of the present invention, for efficient control of a control area included in the building, the central control apparatus 100 may collect information about facilities installed or set up in the control area based on facility plans and control the facilities.

To this end, the central control apparatus 100 may provide a user interface or input/output screen that can receive user input and show a facility control process or a facility control result in response to the user input, through a plan including graphical objects of the facilities.

In this way, the user can manage the facilities efficiently and intuitively by controlling the facilities or equipment based on the facility drawings.

The control area may refer to a control area of interest or a target control area included in the building. For example, the control area may be a certain space or floor included in the building.

As used herein, the building refers to a building structure subject to control, which may include a shopping mall, a convenience store, a store, a house, an office, a factory building, a school, a hospital, etc.

The facility control apparatus 200 may be located between the central control apparatus 100 and the one or more facilities 300 and 300' and execute a control program received from the central control apparatus 100.

That is, the facility control apparatus 200 may be a direct digital controller or programmable logic controller (PLC) that controls the facilities 300 and 300'.

Moreover, the facility control apparatus 200 may exchange information by communicating with the central control apparatus 100, and control the facilities 300 and 300' by executing the control, program or receiving and executing a control command from the control program.

In addition, the facility control apparatus 200 may write or store facility-related information such as control output, status change, etc. of the facilities in the building, through the control points set up in one or more equipment 400 and 400', for example, sensors and operation devices, equipped in the facilities 300 and 300'.

The facility control apparatus 200 may be a microcomputer, for example, that controls or monitors the facilities 300 and 300' or the equipment 400 and 400' according to the control program. In other words, the facility control apparatus 200 is connected to the central control apparatus 100 via a communication network and send and receive required information to and from each other. Accordingly, the control points for air-conditioning or other facilities installed in the building may be monitored or controlled, and input and output signals of the facilities 300 and 300' or equipment 400 and 400' may be controlled directly using built-in functions for the control points.

Specifically, the facility control apparatus 200 may be connected between the central control apparatus 100 and the one or more facilities 300 and 300', and execute the control program or receive and execute a control command from the control program.

The facility control apparatus 200 may transmit the execution result to the central control apparatus 100. To this end, the central control apparatus 100 may include a communication unit as a means for transmitting the control command from the control program to the facility control apparatus 200 and receiving from the facility control apparatus 200 the execution result of the control program or of the control command.

The execution result may further include a display unit as a means for displaying the execution result on the user screen.

The central control apparatus 100, the facility control apparatus 200, and the facilities 300 and 300' may be connected to one another via a communication network.

According to an exemplary embodiment of the present invention, the communication network may include various communication protocols.

For example, the central control apparatus 100, the facility control apparatus 200, and the facilities 300 and 300' may be connected to one another through TCP/IP (Transmission control protocol/Internet protocol) and BACnet (Building Automation & Control Network).

The communication protocols may include CAN, DeviceNet, Profibus, Interbus, LonWorks, and so on Especially, LonWorks can be applied in a variety of ways due to the advantage that it allows for monitoring and control through the internet by easily accessing the internet by the use of all of the OSI 7 layers, and its important is growing.

Central Control Apparatus

Figure 2:
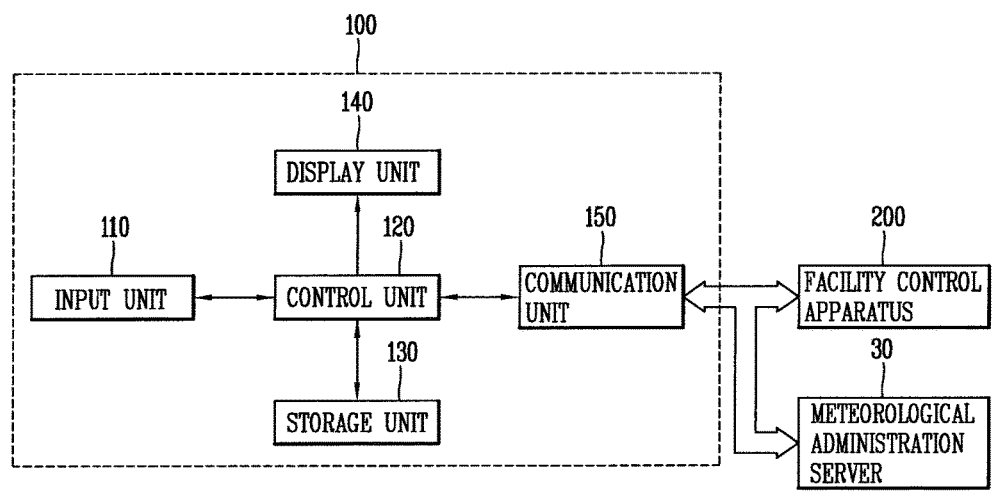
FIG. 2 is a block diagram of the configuration of a central control apparatus according to an exemplary embodiment of the present invention.

FIG. 2 is a block diagram of the configuration of a central control apparatus according to an exemplary embodiment of the present invention.

As shown in FIG. 2, the central control apparatus 100 according to an exemplary embodiment of the present invention comprises a controller 120 that performs control over the facilities 300 and 300' or equipment 400 and 400'.

Also, the central control apparatus 100 according to an exemplary embodiment of the present invention may further include at least one among an input unit 110, a storage unit 130, a display unit 140, and a communication unit 150.

The components illustrated in FIG. 2 are not necessary, so the central control apparatus 100 may have less or more components. The central control apparatus according to an exemplary embodiment of the present invention may further include a variety of components for simulating the power consumption of facilities or equipment subject to control or providing a user interface associated with them.

Hereinafter, the components of the central control apparatus 100 will be discussed in detail.

The input unit 100 is a means for receiving user input for control of the central control apparatus 110. The user may generate input data for the operation control of the central control apparatus 100 through the input unit 100.

The input unit 110 may be composed of a keypad, a dome switch, a touchpad (static pressure type or capacitive type), a jog wheel, a jog switch, etc. The touchpad may be a touchscreen that forms an interlayer structure together with the display unit 140.

For example, the input unit 110 may receive input for setting an environment or parameters associated with hardware or software included in the central control apparatus 100 or input for doing the setting required for the central control apparatus 100 to perform a particular function.

According to an exemplary embodiment of the present invention, the particular function performed by the central control apparatus 100 may be a function of simulating energy usage, determining a combination of at least one control scenario for an energy reduction input, modifying the control scenarios, or controlling facilities or equipment, which will be described later.

Moreover, the input unit 110 may receive control input for controlling facilities or equipment installed in a target control area subject to control.

According to an exemplary embodiment of the present invention, the input unit 110 may receive user input through a user interface provided to the user by the central control apparatus 100. Especially, the user interface may be a graphic user interface (GUI).

For example, the input unit 110 may receive the control input through a graphical object representing facility status information, facility power consumption, energy reduction, etc. to be described later.

In an example, if the user clicks or touches the graphical object displayed on the screen, the controller 120 may set a specific value such as energy reduction in response to input received through the input unit 110, and determine a corresponding combination of control scenarios or perform an operation of controlling facilities or equipment according to the determined combination of control scenarios. In this case, the controller 120 may show the operation procedure or operation result on the screen through the display unit 140.

The graphical object may be various types of graphs, icons, or indicators included in the screen displayed through the display unit 140.

The controller 120 according to an exemplary embodiment of the present invention is a means for controlling the components included in the central control apparatus 100 or the components connected to the central control apparatus 100.

Accordingly, the controller 120 may control the facilities 300 and 300' or the equipment 400 and 400' according to a combination of at least one preset control command, or receive monitoring data on the facilities 300 and 300' or equipment 400 and 400'.

In this case, the controller 120 may control facilities set up in a particular area by the facility control apparatus 200 which communicates with the central control apparatus 100 by a specific communication method.

The specific communication method may be at least one among TCP/IP, BACnet, and LonWorks.

The facility control apparatus 200 may be at least either a direct digital controller or a PLC.

Figure 3:
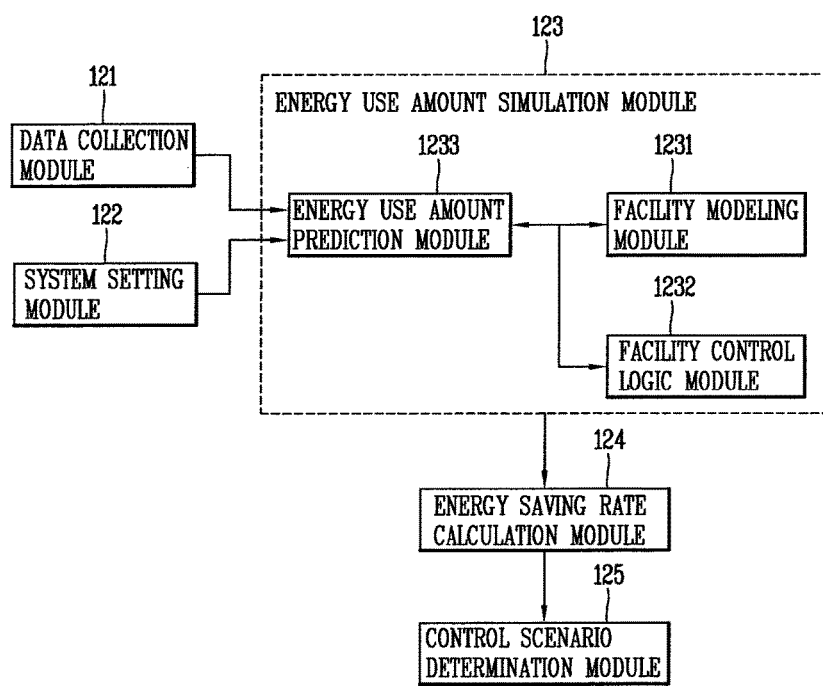
FIG. 3 is a block diagram of functional modules of a controller according to an exemplary embodiment of the present invention.

FIG. 3 is a block diagram of functional modules of a controller according to an exemplary embodiment of the present invention.

As shown in FIG. 3, the controller 120 includes a data collection module 121, a system setting module 122, and an energy usage simulation module 123.

The data collection module 121 may collect predicted environmental data including weather information about a target control area or collect status information about a facility or equipment through control points.

In this case, the data collection module 121 may receive environmental data including various weather information such as temperature and humidity from a meteorological office server 30, predict environment data including weather information by various algorithms, or collect real-time environmental data for the current time and/or predicted environmental data for some future time by retrieving the environmental data including weather information stored in the storage unit 130.

The real-time environment data and/or predicted environmental data is preferably about a zone including a target control area.

The data collection module 121 may collect status information of the facilities 300 and 300' and/or the equipment 400 and 400' from the control points through the communication unit 150.

The system setting module 122 sets information about at least one facility within the target control area.

The system setting module 122 provides the energy usage simulation module 123 with facility information input from the user or read out from various types of storage media.

The facility information is information required to model a facility, and may include the facility's specification such as the construction, capacity, type, etc. of the facility. Also, various types of facility information may further include information about the facility's connections with other facilities, such as the type, number, and combination of facilities connected to other facilities.

Accordingly, the energy usage simulation module 123 may model the facility based on the facility information and simulate the power consumption of the facility model according to a control scenario.

The system setting module 122 may provide the energy usage simulation module 123 with a control scenario for the facilities 300 and 300' or equipment 400 and 4000', in addition to the facility information.

In this case, the system setting module 122 may provide the energy usage simulation module 123 with a control scenario input from the user or read out from various types of storage media.

Herein, the control scenario may be at least one set of control commands having a sequence. That is, the control scenario is a set of control commands for controlling the facilities 300 and 300' or the equipment 400 and 400', concrete examples of which include optimum on/off control, temperature setting control, duty control, etc.

Hereinafter, concrete examples of the control scenario will be described in detail.

Figure 5A:
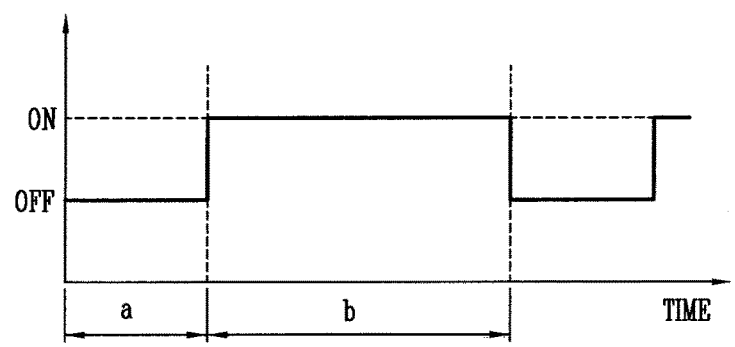
FIG. 5A is a view showing the operating time of a facility according to duty control.

FIG. 5A is a view showing the operating time of a facility according to duty control.

In duty control, the on/off cycle of a facility or equipment is controlled. As shown in FIG. 5A, the ratio (=b/a+b) of on time (b) to one period in which the facility or equipment is turned on and off is controlled.

In an example, if the facility is an air conditioner, the air conditioner may be turned on/off with a duty ratio set according to a set temperature or space load.

Therefore, the controller 120 allows for operating the facility or equipment at a duty ratio which is situation-dependent and varied based on the target control area's status information (or environmental information) or the target control area's external and/or internal load, thereby improving the energy reduction in the facility or equipment.

Figure 5B:
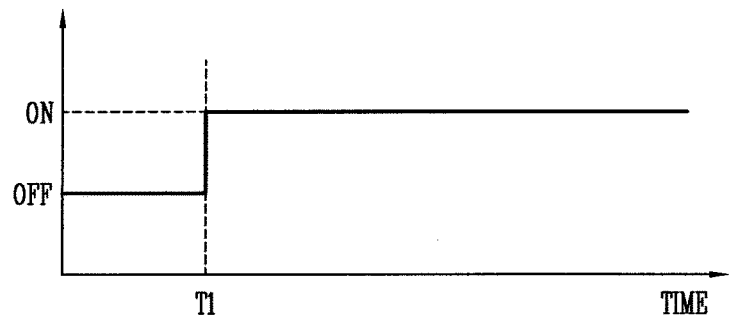
FIGS. 5B(a) and 5B(b) are views showing the operating time of a facility according to optimum on/off control.
Figure 5B:
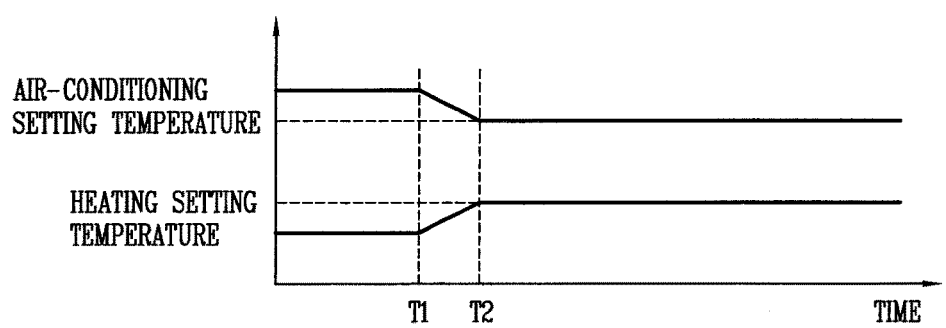

FIG. 5B is a view showing the operating time of a facility according to optimum on/off control.

In optimum on/off control, a facility or equipment is controlled to reduce energy in such a way as to operate the facility or equipment in advance before a preset operation timing for the facility or equipment, based on the temperature set for the target control area and the current temperature in the target area.

As shown in (a) of FIG. 5B, the operation of the facility may be started at time T1. As shown in (b) of FIG. 5B, time T1 is a time earlier than time T2 which is an operation restart time for the target control area. The controller 120 calculates how much earlier facility on/off control should be done before time T2, based on the temperature set for the target control area and the current temperature in the target area. In this way, energy can be reduced.

Figure 5C:
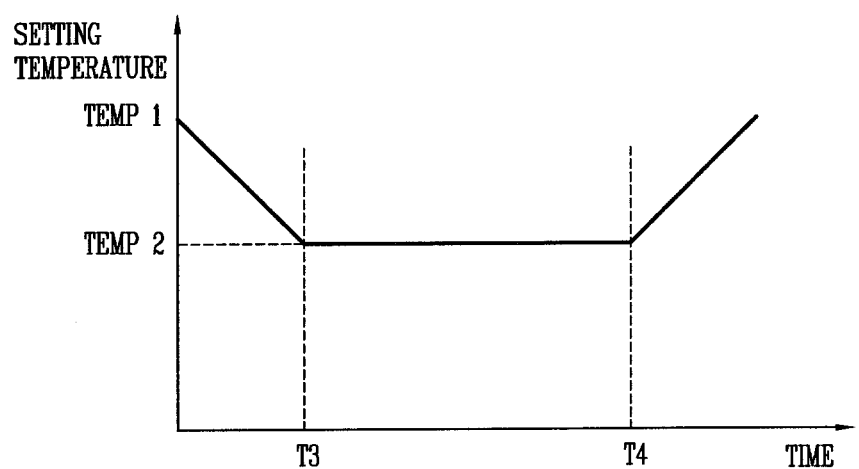
FIGS. 5C(a) and 5C(b) are views of temperature setting control depending on the load on a target control area.
Figure 5C:
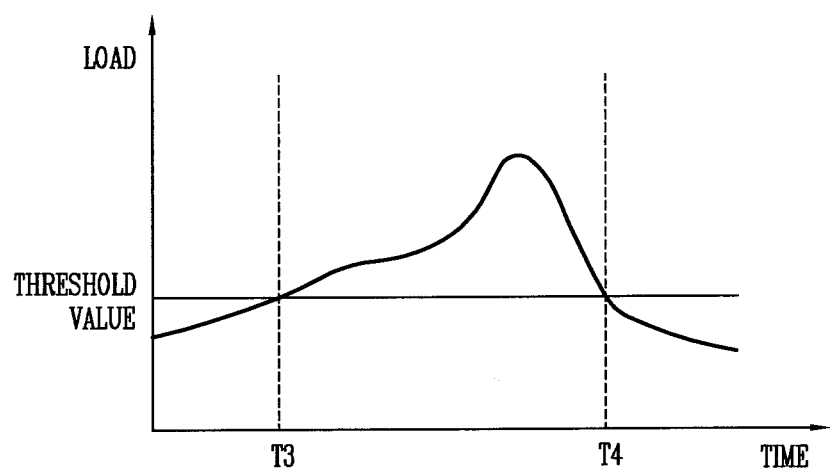

FIG. 5C is a view of temperature setting control depending on the load on a target control area.

In temperature setting control, the temperature setting may be changed depending on the space load on the target control area.

As shown in (b) of FIG. 5C, the space load (or internal load) on the target control area from time T3 to time T4 may be above a threshold due to an increase in the amount of heat generation (caused by, for example, an electric heater's operation, an increase in the number of people in the target control area, etc.). In this instance, the temperature set for the target control area may be lowered to Temp2 for the period between T3 and T4, in the case of air-conditioning facilities.

By setting the temperature depending on space load (or internal load) for air-conditioning facilities, the energy used by that facility can be reduced since as much load as needed for the target control area is supplied and removed.

Meanwhile, in the case of a facility or equipment that is controlled according to a control scenario, or in the case of air-conditioning facilities or equipment, it is preferable that the temperature for the target control area is controlled within a preset comfort level.

Hereinafter, the comfort level will be discussed in detail.

Figure 6:
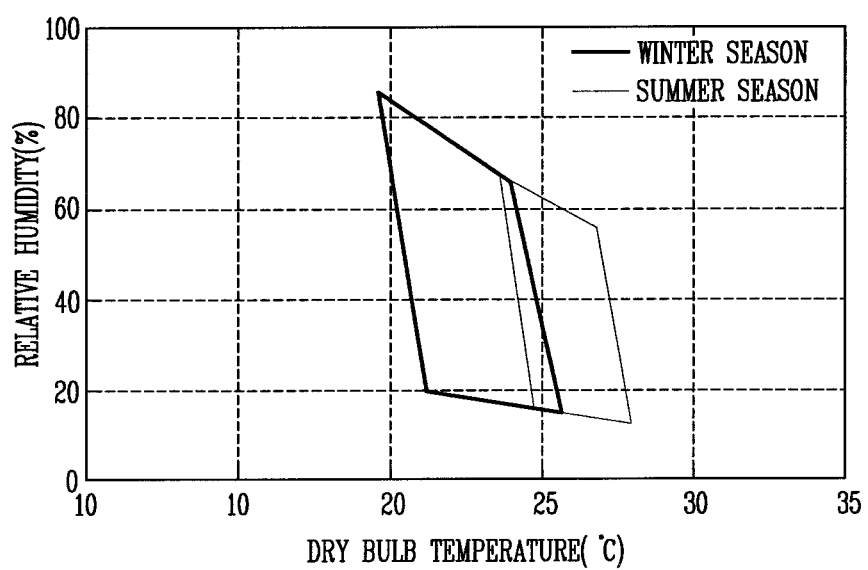
FIG. 6 is an illustration of seasonal variation of the comfort zone.

FIG. 6 is an illustration of seasonal variation of the comfort zone.

In this instance, the comfort zone may be a comfort index that was calculated by the Predicted Mean Vote (PMV) and the Predicted Percentage of Dissatisfied (PPD), defined in the ASHRAE Standard 55-20101, a standard that establishes thermal environmental conditions for occupants, among the standards proposed by the American Society of Heating, Refrigerating, and Air-Conditioning Engineers (ASHRAE).

The comfort level may be calculated based on factors such as air temperature, mean radiant temperature, relative humidity, air speed, activity level (Met.), and clothing quantity (CLO).

According to a preset criterion, if the PPD is less than 10%, the target control area may be rated as comfortable, if the PPD is no less than 10% and less than 25%, the target control area may be rated as moderately comfortable, and if the PDD is no less than 25%, the target control area may be rated as uncomfortable.

In an example, default values for setting comfort zones by seasons can be shown in the following Table 1.

TABLE 1

| Run # | Air Temp. °F. | Air Temp. °C. | RH % | Radiant Temp. °F. | Radiant Temp. °C. | Air Speed FPM | Air Speed m/s | Met. | CLO | PMV | PPD % |
|---|---|---|---|---|---|---|---|---|---|---|---|
| 1 | 67.3 | 19.6 | 86 | 67.3 | 19.6 | 20 | 0.10 | 1.1 | 1 | −0.5 | 10 |
| 2 | 75.0 | 23.9 | 66 | 75.0 | 23.9 | 20 | 0.10 | 1.1 | 1 | 0.5 | 10 |
| 3 | 78.2 | 25.7 | 15 | 78.2 | 25.7 | 20 | 0.10 | 1.1 | 1 | 0.5 | 10 |
| 4 | 70.2 | 21.2 | 20 | 70.2 | 21.2 | 20 | 0.10 | 1.1 | 1 | −0.5 | 10 |
| 5 | 74.5 | 23.6 | 67 | 74.5 | 23.6 | 20 | 0.10 | 1.1 | 0.5 | −0.5 | 10 |
| 6 | 80.2 | 26.8 | 56 | 80.2 | 26.8 | 20 | 0.10 | 1.1 | 0.5 | 0.5 | 10 |
| 7 | 82.2 | 27.9 | 13 | 82.2 | 27.9 | 20 | 0.10 | 1.1 | 0.5 | 0.5 | 10 |
| 8 | 76.5 | 24.7 | 16 | 76.5 | 24.7 | 20 | 0.10 | 1.1 | 0.5 | −0.5 | 10 |

That is, the areas #1 to #4 may be set as comfort zones in the summer season, and the areas #5 to #8 may be set as comfort zones in the winter season.

As shown in FIG. 6, this can be represented by a graph using factors such as dry-bulb temperature and relative humidity.

The energy usage simulation module 123 may include a facility modeling module 1231, a facility control logic module 1232, and an energy usage prediction module 1233.

The facility modeling module 1231 may model a facility based on facility information provided from the system setting module 122.

That is, the facility modeling module 1231 may model a facility by modeling individual components included in the facility based on facility information and modeling the rate of heat flowing in and out between the components (for example, the temperature, flow rate, etc. of a fluid moving between the components).

Figure 4A:
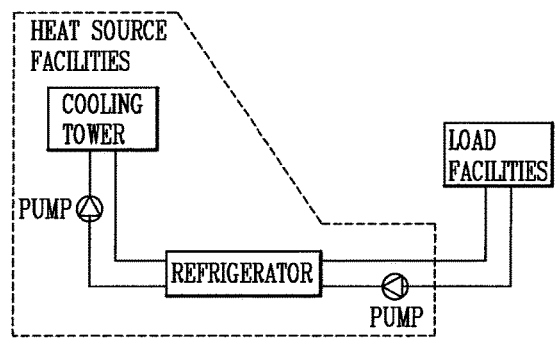
FIG. 4A is view of the configuration of a cooling tower system as a facility.
Figure 4B:
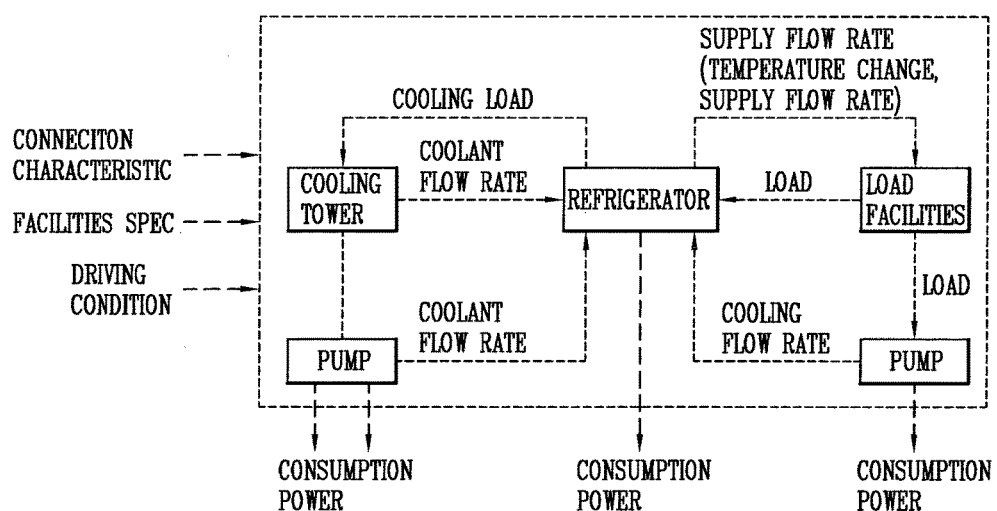
FIG. 4B is a modeled view of the configuration of the facility of FIG. 4A.

In a concrete example, FIG. 4 is view of the configuration of a cooling tower system as a facility. FIG. 4B is a modeled view of the configuration of the facility of FIG. 4A.

As shown in FIG. 4A, the cooling tower system may include heat source facilities that generate heat with energy from load facilities, a heat load processed by the heat source facilities.

The heat source facilities may include a cooling tower, a chiller, a pump between the cooling tower and the chiller, and a pump between the load facilities and the chiller. A modeled view of the configuration of the heat source facilities can be depicted in FIG. 4B.

That is, as shown in FIG. 4B, the cooling tower system may be modeled with the temperature of cooling water received by the chiller from the cooling tower, the cooling load of the cooling tower, the flow rate of cooling water from a pump located between the chiller and the cooling tower, the amount of heat supply (e.g., temperature change and supply flow rate) from the chiller to the load facilities, the amount of heat (load) the load facilities requires the chiller to supply, a cooling flow between the load facilities and a pump located between the load facilities and the chiller, and the pressure difference (load) between the load facilities and the pump.

The facilities 300 and 300' or equipment 400 and 400' may be modeled by a variety of conventionally well-known methods.

A facility modeled by the facility modeling module 1231 may be provided to the energy usage prediction module 1233, and the energy usage prediction module 1233 may simulate energy usage using the facility model.

That is, in the energy usage prediction module 1233, any one among facility type, facility capacity, facility's connections with other facilities, and operating condition may be an input parameter for the facility model, and the power consumption of the facility model may be an output parameter for the facility model.

The facility operating condition may be at least one among external load, internal load, and facility startup time, or a combination thereof.

In an example, as shown in FIG. 4B, if at least either the facility's connections with other facilities, the facility's specification, and the facility operating condition or a combination thereof are given as the input parameter, the energy usage prediction module 1233 may calculate the power consumption and Coefficient of Performance (COP; including energy consumption efficiency) by using the modeled cooling tower system, calculate the power consumption and supply flow rate of the pumps, and calculate the power consumption and cooling water supply temperature of the cooling tower.

That is, the controller 120 may calculate the relationship between at least one unit of prediction environmental data about a target control data and the amount of power consumed by the facility by using the facility model and the space load (or internal load). As described above, the predicted environmental data may be environmental data that contains various weather information such as the internal and/or external temperature, humidity, etc. in the target control data received from the meteorological office server 30 through the communication unit 150.

In this instance, when simulating the power consumption of the facility model, the energy usage prediction module 1233 may do the simulation by target control area or by time.

That is, if there are a plurality of target control areas, the controller 120 may calculate the relationship between the prediction environmental data and the power consumption for each of the target control areas.

Moreover, the power consumption of the facility at a specific time or for a specific period of time may be predicted by calculating the facility's power consumption by time.

As used herein, the term 'space load' refers to internal load which is the opposite of external load. The external load may be represented by the amount of heat based on environmental data (including temperature, humidity, etc.) received from the meteorological office server 30, and the space load may be calculated by a variety of well-known means. According to one exemplary embodiment, the space load may be calculated by a thermal equilibrium equation represented through heat transfer modeling of a target control area, as shown in Mathematical Expression 1.

$$\rho c_p V_Z \frac{dT_Z}{dt} =$$
$$\Sigma \beta h_{i-envelop} A_{envelop}(T_{i-envelop} - T_Z) +$$
$$\Sigma U_{win} A_{win}(T_{amb} - T_Z) +$$
$$\Sigma q_{sol}^n \lambda_{shgc} A_{win} + \dot{m}_{sys} c_p(T_{sys} - T_Z) +$$
$$\dot{m}_{inf} c_p(T_{amb} - T_Z) + q_{sens,outer}$$

[Mathematical Expression 1]

where ρ is density (kg/cm³), cp is specific heat (W/kg K)), V is volume (m³), T is temperature (K), h is heat transfer coefficient, U is overall heat transfer coefficient, A is area (m²), q is amount of solar radiation per unit area (W/m²), λshgc is shading coefficient, ṁ is mass flow rate (kg/s), $q_{sens}$ is amount of internal heat generation (W).

The thermal equilibrium equation shown in Mathematical Expression 1 may be established by a first heat amount with respect to the rate of temperature change in the target control area and a second heat amount with respect to the amount of heat entering and exiting the target control area.

Specifically, as shown in Mathematical Expression 1, the second heat rate may include the rate of heat transfer through the outer wall with respect to a rate of change in outdoor temperature, the rate of heat transfer through the windows with respect to the rate of change in outdoor temperature, the rate of change in the amount of heat with respect to the amount of solar radiation through the windows, and the rate of change in the amount of heat supplied and removed by the air conditioner 310, the rate of change in the amount of heat with respect to the infiltration of outside air directly into an indoor space (air entering the indoor space through the outer wall, window gaps, doors opening and closing, and so on), and the amount of internal heat generation in the indoor space (e.g., the amount of heat generation from human bodies, lighting, various kinds of heat generators, etc.).

Herein, when calculating the amount of internal heat generation in the indoor space, which is included in the rate of second heat, it is preferable that the amount of internal heat generation in the indoor space includes the amount of heat generation from human bodies based on the number of occupants in the target control area.

The amount of heat generation from human bodies may be linearly calculated by multiplying the amount of heat generation per person by the number of occupants. Preferably, the amount of heat generation from human bodies may be calculated based on a calculated number of occupants in the target control area, by using the amount of heat generation from human bodies with respect to the number of occupants stored in a storage means.

A certain part of the target control area, formed inward from at least one side of the outer wall, may be defined as an outer peripheral part, and the remaining part may be defined as an inner peripheral part. The controller 120 may calculate the space load by applying the thermal equilibrium equation to each of the outer and inner peripheral parts.

The space load may be calculated using predicted environmental data received by the controller 120 from the meteorological office server 30 through the communication unit 150.

Meanwhile, as described above, the energy usage prediction module 1233 may simulate the amount of power consumed by the facility model operating according to a set control scenario, by using information about the facility.

As described above, an input parameter for calculating the energy usage of the facility model may be a facility operating condition, including at least one among external load, internal load, and facility startup time, or a combination thereof.

Moreover, in order that the energy usage prediction module 1233 calculates the amount of power consumed by the facility model operating according to a preset control scenario, the facility control logic module 1232 may set at least one control scenario applicable to the facility and provide it to the energy usage prediction module 1233.

As described above, the system setting module 122 may provide the energy usage simulation module 123 with a control scenario input by the user or read out from various types of storage media.

In this instance, the facility control logic module 1232 may select a control scenario applicable to a facility, i.e., a target whose power consumption is to be simulated, among a plurality of control scenarios provided from the system setting module 122.

The facility control logic module 1232 may select at least one of a plurality of control scenarios provided from the system setting module 122, based on the facility modeled by the facility modeling module 1231, or select at least one of a plurality of control scenarios based on the facility's specification or the like provided by the system setting module 122.

Accordingly, the energy usage prediction module 1233 may simulate the power consumption of the facility model when the facility modeled by the facility modeling module 1231 operates according to at least one control scenario selected by the facility control logic module 1232.

The energy usage prediction module 1233's simulation time for the power consumption of the facility may be a preset time or a preset, period. Preferably, 24 hours of predicted environmental data for the day may be received from the meteorological office server 30 at midnight (0:00 a.m.), and the power consumption of the facility model may be simulated using this data.

Meanwhile, according to an exemplary embodiment of the present invention, the controller 120 may further include an energy reduction calculation module 124 that calculates the energy reduction in the facility or target control area based on a simulation result of the power consumption of the facility model operating according to a combination of at least one control scenario.

The energy reduction calculation module 124 may calculate energy reduction using the ratio of power consumption of the facility model operating according to a combination of at least one control scenario, calculated by the energy usage simulation module 123, with respect to the energy usage of a facility or equipment to which energy-saving control is not given (herein, referred to as 'baseline').

Preferably, the energy reduction calculation module 124 may calculate the relationship between the energy reduction (or power consumption) in a facility or equipment and a combination of at least one control scenario.

According to an exemplary embodiment of the present invention, the relationship between energy reduction (or power consumption) and at least one corresponding combination of control scenarios may be calculated by calculating energy reduction with respect to energy usage calculated when a modeled facility or equipment operates according to every combination of at least one control scenario applicable to that facility or equipment.

The storage unit 130 may store the calculated relationship between the energy reduction (or power consumption) in the facility or equipment and the combination of at least one control scenario.

In this instance, the energy reduction for a facility or equipment operating according to first and second control scenarios cannot be calculated simply by adding the energy reduction for the facility or equipment operating according to the first control scenario and the energy reduction for the facility or equipment operating according to the second control scenario. Thus, it is preferable that this calculation is made based on the energy usage of a facility model or equipment operating according to every combination of at least one control scenario. However, the scope of the present invention is not limited thereto, and the relationship between the energy reduction (or power consumption) in a facility or equipment and a combination of at least one control scenario may be calculated in other various ways.

Meanwhile, according to an exemplary embodiment of the present invention, the controller 120 may determine a combination of at least one control scenario for a facility or equipment based on the energy reduction by using the energy reduction calculation module, and control the facility or equipment according to the determined combination of at least one control scenario.

Accordingly, using the relationship between the energy reduction (or power consumption) in a facility or equipment calculated by the energy reduction calculation module 124 and a combination of at least one control scenario, the controller 120 may present the user a corresponding combination of at least one control scenario based on a preset energy reduction rate or an energy reduction rate input by the user and, moreover, control the operation of the corresponding facility or equipment according to a determined combination of at least one control scenario.

Therefore, according to one exemplary embodiment, the user may set a control scenario consisting of a combination of control commands for a facility or equipment subject to control. Also, even a user with little knowledge about the facility or equipment or a user with no knowledge about the control scenario may control the facility or equipment according to a determined combination of at least one control scenario, simply by setting an energy reduction rate.

As shown in FIG. 2, the central control apparatus 100 according to one exemplary embodiment of the present invention may further include a storage unit 130.

The storage unit 130 may store the relationship between the energy reduction (or power consumption) in a facility or equipment and a combination of at least one control scenario.

The storage unit 130 may store a program for processing and control by the controller 120 and perform the function for temporarily storing input/output data (e.g., data collected by the data collection module 121, facility information, control scenario information, relationship between energy reduction and a combination of control scenarios, various user inputs, etc.).

The storage unit 130 may include at least one type of storage medium among flash memory type, hard disk type, SSD (Solid State Disk or Solid State Drive), multimedia card micro type, card-type memory (e.g., SD or XD memory), RAM (Random Access Memory), SRAM (Static Random Access Memory), ROM (Read-Only Memory), EFPROM (Electrically Erasable Programmable Read-Only Memory), PROM (Programmable Read-Only Memory), magnetic memory, magnetic disk, and optical disk.

The central control apparatus 100 may run web storage on the internet to implement the storage unit 130's storage function.

As shown in FIG. 2, the central control apparatus 100 according to an exemplary embodiment of the present invention may further include a display unit 140.

The display unit 140 according to an exemplary embodiment of the present invention is a display device connected wirelessly or wired to the central control apparatus 100, which displays and outputs information processed by the central control apparatus 100. For example, the display unit 140 may display a UI (User Interface) or GUI (Graphic User Interface) related to the functions provided by the central control apparatus 100.

Accordingly, the display unit 140 may show the energy usage and/or energy reduction in the facility or equipment, calculated by the controller 120, on the screen in various forms such as text or graphs.

Also, the controller 120 may match a graphical object of the facility or equipment with the facility or equipment's installation position on various drawings, and display it on the screen through the display unit 140.

Accordingly, the user may select the graphical object displayed on the screen through the display unit 140 so that the controller 120 may show status information or control command list for the facility or equipment corresponding to the selected graphical object on the screen through the display unit 140.

In this instance, the display unit 140 may include at least one among a liquid crystal display, a thin film transistor liquid crystal display, an organic light-emitting diode, a flexible display, and a 3D display. Also, two or more display units 140 may be present depending on the form of implementation. For example, both an external display device and an internal display device (not shown) may be provided in the central control apparatus 100.

If the display unit 140 and a touch motion sensor (hereinafter, 'touch sensor') form an interlayer structure (hereinafter, 'touchscreen'), the display unit 140 may be used as an input device, as well as an output device. The touch sensor may take the form of a touch film, touch sheet, a touchpad, etc.

Meanwhile, according to an exemplary embodiment of the present invention, the central control apparatus 100 may further include a communication unit 150, as illustrated in FIG. 2.

The communication unit 140 may send and receive control commands, a control program, or execution results of the control program directly to and from facilities 300 and 300' or equipment 400 and 400', or send and receive control commands, a control program, or execution results of the control program to and from the facility control apparatus 200.

The communication unit 150 may receive a result of facility control by the facility control apparatus 200 or information about a control process from the facility control apparatus 200.

Moreover, the communication unit 150 may receive various information (e.g., status information) about the facilities from a plurality of control points.

In this way, the facility control apparatus 200 may control the facilities or equipment subject to control.

The communication unit 150 may communicate with a meteorological office server 30, and receive environmental data including various weather information such as temperature and humidity from the meteorological office server 30 and receive real-time environmental data for the current time and/or predicted environmental data for some future time.

The real-time environment data and/or predicted environmental data is preferably about a zone including a target control area.

The communication unit 150 may pass the various information received from the meteorological office server 30 to the controller 120, and the controller 120 may then calculate the external and internal loads of the target control area using the real-time environmental data and/or predicted environmental data, and simulate the power consumption of a facility model based on the external and internal loads.

The central control apparatus 100 may be connected to an external terminal 500 through the communication unit 150. The user of the central control apparatus 100 may perform the central control apparatus 100's functions (e.g., facility management or control functions) through the external terminal. Herein, the external terminal may be various types of terminals including a mobile terminal.

In this instance, the communication unit 150 may be implemented as a module to communicate with the meteorological office server 30, the facility control apparatus 200, and the external terminal, and it is needless to say that the communication unit 150 may be implemented as different modules for different communication targets.

The communication unit 150 may perform wired and wireless data communications with the external terminal. The communication unit 150 may include electronic parts for one or more of the following: Bluetooth™, Zigbee, UWB (UltraWideBand), Wire/Wireless USB, NFC (Near Field Communication), Wire/Wireless LAN, and a mobile communication network.

As described above, the central control apparatus 100 according to an exemplary embodiment of the present invention may include an input unit 110, and the input unit 110 may receive user input for setting an energy reduction rate from the user.

FIGS. 7A to 7D are views illustrating an example of a screen displayed by the central control apparatus according to an exemplary embodiment of the present invention.

Figure 7A:
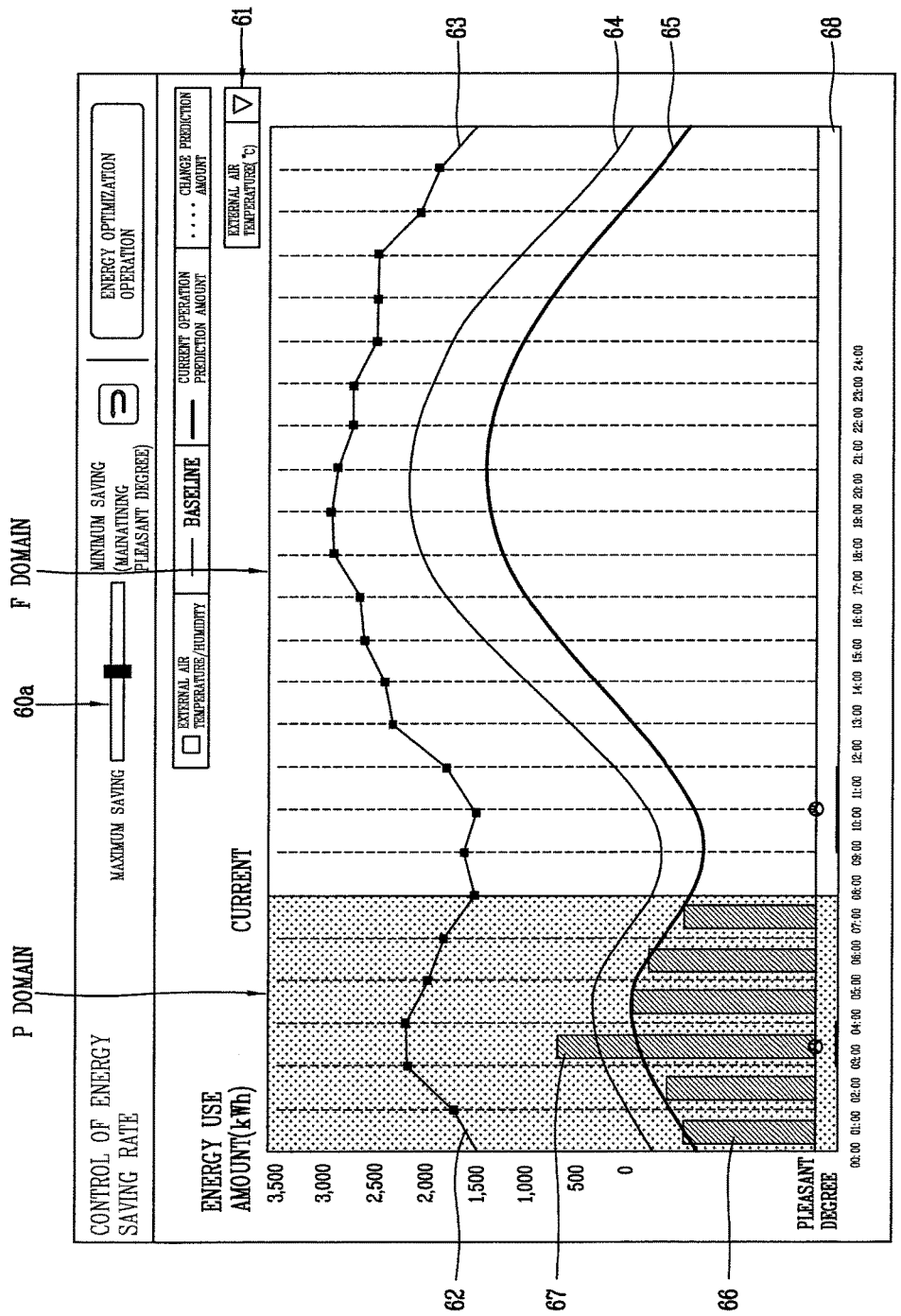

As shown in FIG. 7A, the central control apparatus according to an exemplary embodiment of the present invention may display a scroll bar 60a on the screen through the display unit 140, to receive input for setting an energy reduction rate.

The user may set an energy reduction rate by moving the scroll bar 60a displayed on the screen, and the controller 120, more specifically, the control scenario determination module 125, may determine a combination of at least one control scenario based on the energy reduction rate set by the scroll bar 60a.

In this case, an energy reduction rate input by the user through the scroll bar 60a may be in the range between 0% and 100%, preferably, a preset energy reduction range.

Herein, the present energy reduction range may be a predetermined comfort level range. That is, when the user controls the energy reduction in a facility or equipment for air-conditioning a target control area, an energy reduction rate set by the scroll bar 60a may be limited to a comfort level range preset for the target control area.

Therefore, when a user with little knowledge about the facility or equipment or a user with no knowledge about the control scenario controls the facility or equipment, the energy reduction rate may be limited to prevent people in the target control area from feeling uncomfortable.

However, if the preset energy reduction range is a predetermined comfort level range, it is preferable that the preset energy reduction range is changed depending on the season, time, external or inside air temperature (or humidity), or external or internal load.

According to another exemplary embodiment of the present invention, as shown in FIG. 7B, the central control apparatus 100 may display an input window 60b on the screen to receive input for setting an energy reduction rate through the display unit 140.

The input unit 60b may be configured to receive numerical input directly from the user or to increase or decrease the percentage in the input window 60b in preset increments or decrements by choosing the buttons (e.g., ▲/▼ buttons) at one side of the input window 60b.

The controller 120 may display a graph 65 of energy usage over time on the screen by using a simulation result of the power consumption of the facility model operating according to a combination of at least one control scenario that is determined based on an input percentage of energy increase or decrease according to the foregoing exemplary embodiment.

In this instance, according to another exemplary embodiment for receiving input for setting an energy reduction rate, as shown in FIGS. 7A and 7B, input for setting an energy reduction rate may be received by the user's vertically moving the graph of energy usage over time, indicated by reference numeral 65.

That is, if the user moves the graph of reference numeral 65 in a vertical direction by drag & drop, the energy reduction rate may be set to a predetermined range depending on the position where the graph is moved.

Meanwhile, the display unit 140 may display a graph 63 of at least one piece of predicted environmental data (e.g., outside air temperature or humidity, inside air temperature or humidity, and so on) about the target control area, received from the meteorological office server 30 through a baseline 64 and the communication unit 150, or predicted usage on the screen with respect to time.

Herein, as described above, the baseline 64 is a graph showing the energy usage of a facility or equipment to which energy-saving control according to the present invention is not given. For example, if the facility or equipment is a facility or equipment for air-conditioning the target control area the baseline may be an energy usage-time graph for a facility or equipment whose operation is controlled depending on a temperature set by user input.

Also, the display unit 140 displays at least one piece of predicted environmental data (e.g., outside air temperature or humidity, inside air temperature or humidity, and so on) about the target control area on the screen. That is, the display unit 140 may receive user input for selecting at least one predicted environmental data to be displayed on the screen in the form of a combo box, a list box, an edit box, etc. and display a graph of the predicted environmental data selected by the user input.

According to a concrete example, upon receiving user input for selecting outside air temperature through a combo box 61, the display unit 140 may display a graph 63 of outside air temperature for a predetermined period received from the meteorological office server 30, on the screen.

Also, the controller 120 may calculate the comfort level with respect to time according to a predetermined standard such as PMV or PPD as described above, by using the predicted environmental data received from the meteorological office server 30, and display a graphical object of the calculated comfort level on the screen according to a predetermined comfort level range.

In a concrete example, if the PPD is less than 10%, a graphical object of a smiling face may be displayed in the corresponding time slots, if the PPD is no less than 10% and less than 25%, a graphical object of an expressionless face may be displayed in the corresponding time slots, and if the PDD is no less than 25%, a graphical object of a frowning face may be displayed in the corresponding time slots. By displaying the graphical object of the frowning face at 02:00 to 03:00 and at 07:00 to 09:00, as shown in FIGS. 7A and 7B, the user may recognize at a glance that the target control area is rated as uncomfortable in the corresponding time slots.

Meanwhile, the controller 120 according to an exemplary embodiment of the present invention may determine a combination of at least one control scenario based on an energy reduction rate input through the input unit 110. Thus, the controller 120 may control the facility or equipment directly or through the facility control apparatus 200 according to the determined combination of at least one control scenario.

The display unit 140 displays an "energy optimization" button (indicated at the right upper edge of FIGS. 7A and 7B), and if the energy optimization button is chosen through the input unit 110, the controller 120 may display a graph of the power consumption of a facility or equipment model operating according to a combination of at least one control scenario determined based on an energy reduction rate input by the user, or may control the real facility or equipment modeled according the combination of at least one control scenario determined based on the energy reduction rate.

In this instance, the display unit 140 may display on the screen the combination of at least one control scenario determined based on the energy reduction rate input by the user to let the user know according to which control scenario the corresponding facility or equipment operates.

Figure 7C:
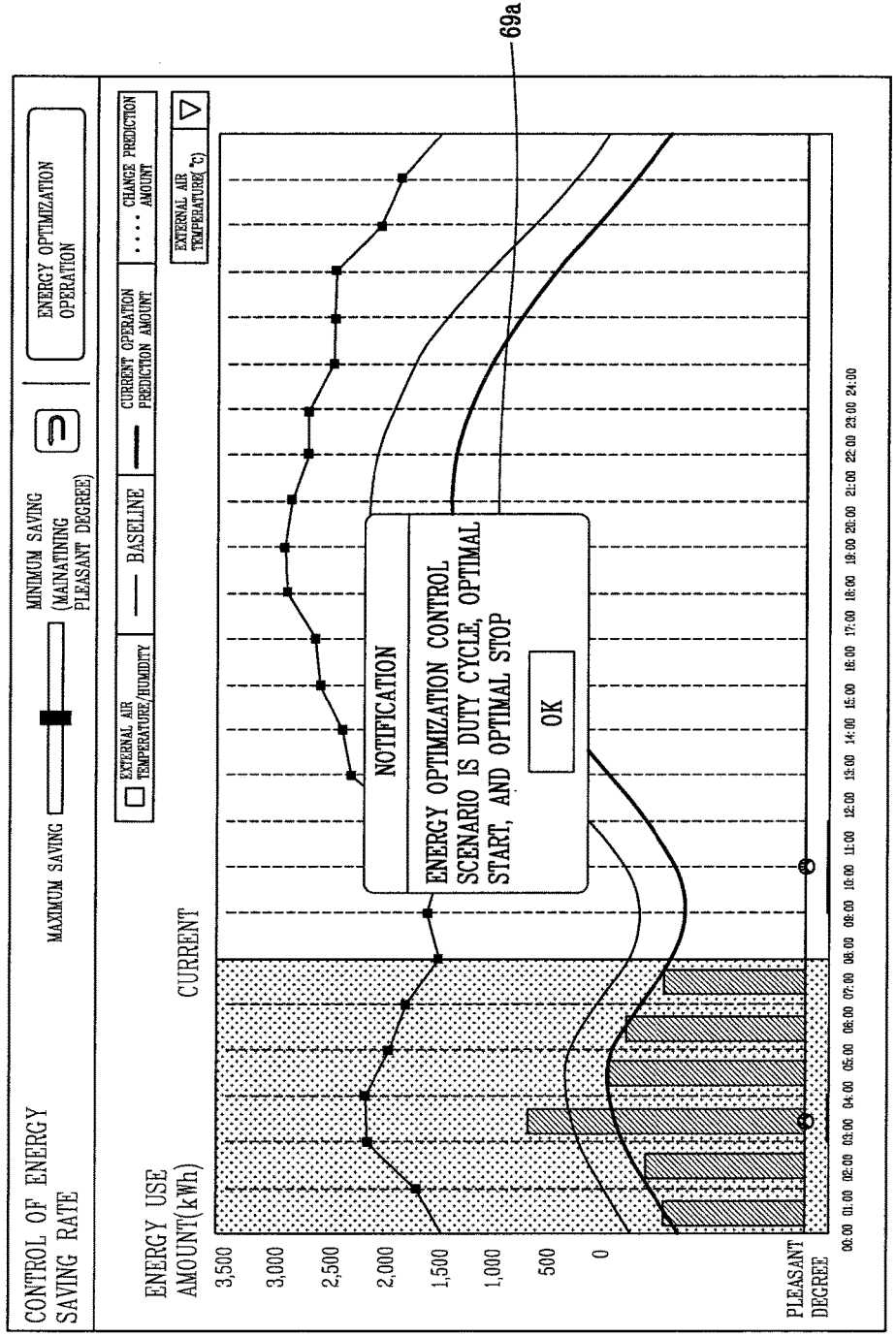

FIG. 7C is an illustration of a screen showing a combination of control scenarios determined based on an energy reduction rate.

As shown in FIG. 7C, the display unit 140 may display a message window 69a showing a combination of at least one control scenario determined based on an energy reduction rate input by the user by means of the controller 120, more specifically, the control scenario determination module 125.

Meanwhile, as seen from above, if the facility or equipment controlled according to the combination of at least one control scenario determined by means of the controller 120 is a facility or equipment for air-conditioning, the controller 120 may display on the screen a graph of at least one among a baseline, predicted usage indicative of a simulation result of the power consumption of a facility model operating according to the combination of at least one control scenario (hereinafter, abbreviated as 'predicted usage'), and predicted environmental data about a target control area, through the display unit 140.

In an example, as shown in FIGS. 7A and 7B, an outside air temperature of the target control area, a baseline, and predicted usage indicative of a simulation result of the power consumption of a facility model operating according to a combination of at least one control scenario may be shown on the screen.

In this case, it is preferable that the display unit 140, displays a graph in two distinct domains (P and F domains) on the screen, marked off by the present time, as shown in FIGS. 7A and 7B.

That is, according to an exemplary embodiment of the present invention, the display unit 140 may display, in the time domain (F domain) after the present time on the screen, a graph of at least one among a baseline, predicted usage representing a simulation result of the power consumption of a facility model operating according to the combination of at least one control scenario, and predicted environmental data about a target control area, and may update and display the baseline, the predicted usage, and the status information in the time domain (P domain) before the present time as time passes after the present time.

Specifically, the predicted environmental data shown in the time domain (P domain) before the present time may be displayed as an updated graph by using the facility or equipment's status information collected through control points by the data collection module 121.

Also, the predicted usage may be shown in such a manner that the controller 120, more specifically, the energy usage simulation module 123, simulates the power consumption of the facility model based on environmental data collected at a certain time or for a certain period of time by the data collection module 121, and a graph of predicted usage already output in the time domain (P domain) before the present time may be updated and displayed.

Also, a graph of predicted environmental data in the time domain (F domain) after the present time also may be updated and displayed using predicted environmental data (e.g., outside air temperature or humidity, inside air temperature or humidity, and so on) about the target control area, received in real time or at preset time intervals from the meteorological office server 30 through the communication unit 150.

Meanwhile, it is preferable that the controller 120 receives the actual power consumption of a target facility whose predicted usage has been simulated, from the data collection module 121 through control points and displays various types of graphs of actual power consumption 66 and 67 on the screen.

In an example, as shown in FIGS. 7A and 7B, a bar graph of the actual power consumption of the target facility whose predicted usage has been simulated at predetermined time intervals (e.g., every hour) may be displayed on the screen.

In this case, it can be observed that the actual power consumption 66 and 67 is similar to the energy usage in the graph 65 representing a simulation result of the power consumption of the facility model operating according to a combination of at least one control scenario that is determined based on a percentage of energy increase or decrease input by the user. This indicates that the accuracy of predicted usage according to the present invention is relatively high.

In an example, however, if the user forces a facility or equipment to operate at their discretion, or in case of a failure in at least one among the facility or equipment, the facility control apparatus, and the central control apparatus, the actual power consumption 67 may exceed predicted usage indicative of a simulation result of the power consumption of the facility model according to a combination of at least one control scenario.

Accordingly, if the difference between the actual power consumption and the predicted usage is out of a preset range, it may be preferable to output an alarm on the screen.

Figure 7D:
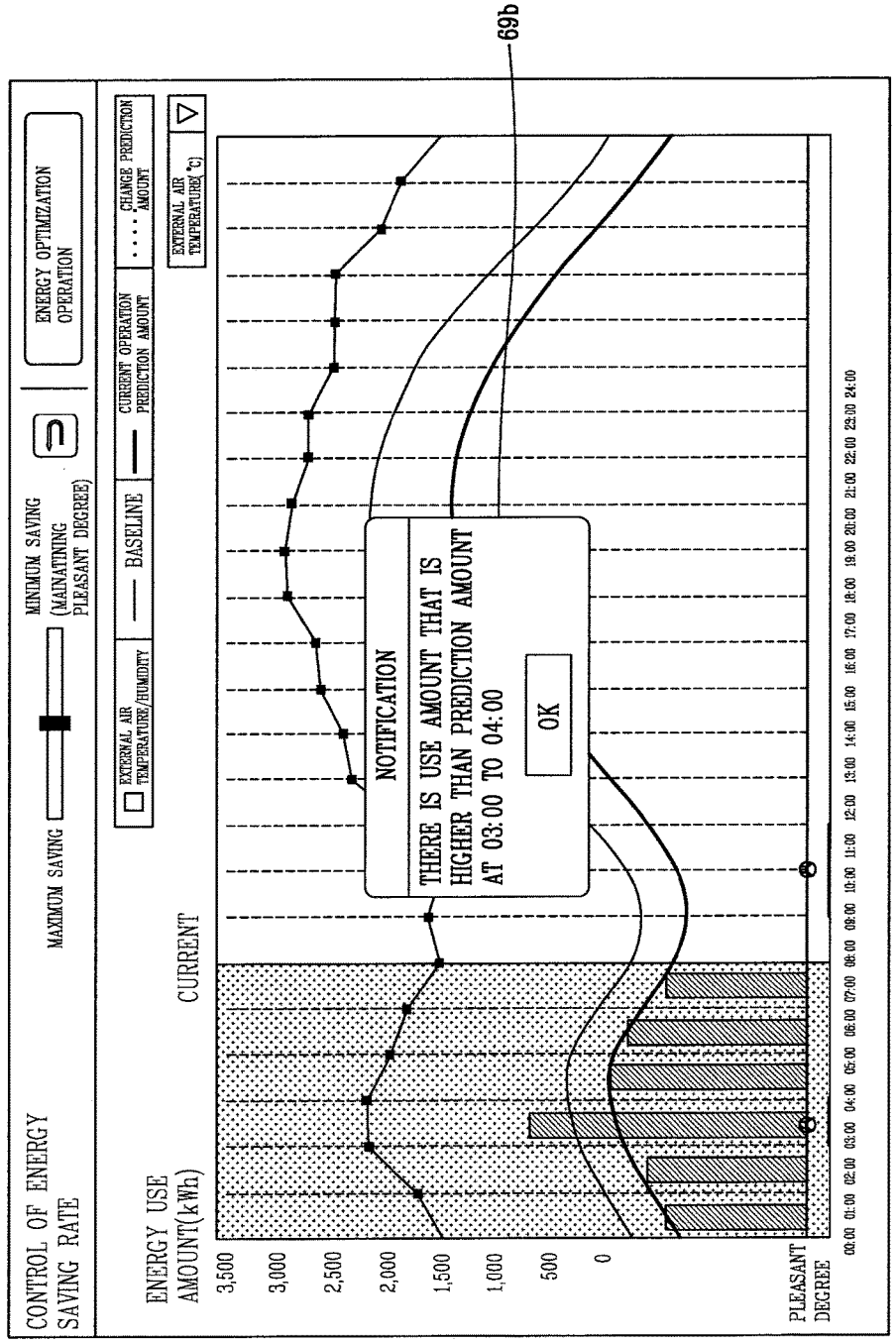

FIG. 7D is an illustration of a screen that appears when measured energy usage is higher than predicted usage indicative of a simulation result of the power consumption of a facility model.

That is, as shown in FIG. 7D, if the difference between the actual power consumption and the predicted usage is out of a preset range, a message window 69b may appear on the screen to give a warning to the user.

The preset range may be arbitrarily set by the user, preferably, greater than a range of error between the predicted usage and the actual power consumption.

The range of error may be set by user input, or the controller 120 may set the range of error based on the difference between previously-measured actual power consumption and the predicted usage. That is, data on the previously-measured actual power consumption and the predicted usage may be collected for a predetermined period of time, and the range of error may be set to the average difference between the actual power consumption for the collection period and the predicted usage.

In an example, as shown in FIG. 7D, if the actual energy usage for 03:00 to 04:00 exceeds the predicted usage, a message window may appear on the screen to warn the user, and at the same time the warning may be externally output visually or acoustically.

Meanwhile, according to an exemplary embodiment of the present invention, at least one target control area may be selected from among a plurality of target control areas through the input unit 110, and the display unit 140 may display the predicted usage or energy reduction rate for a facility included in this target control area on the screen based on the selected at least one target control area.

Also, input for selecting at least one facility or equipment subject to control from among a plurality of facilities or equipment may be received through the input unit 110, and the display unit 140 may display the predicted usage or energy reduction rate for the selected at least one facility or equipment on the screen.

That is, the user may select facilities or equipment according to target control areas or according to groups created according to certain criteria, and the predicted usage or energy reduction rate for the facilities or equipment included in the selected target control area or selected group may be displayed on the screen.

Accordingly, a combination of at least one control scenario may be determined for at least one facility or equipment selected according to target control areas or groups, based on an energy reduction rate input by the user, and the corresponding facility or equipment may be controlled according to the determined combination of control scenarios.

Therefore, the user may perform energy-saving control with ease according to target control areas or according to groups.

Figure 9A:
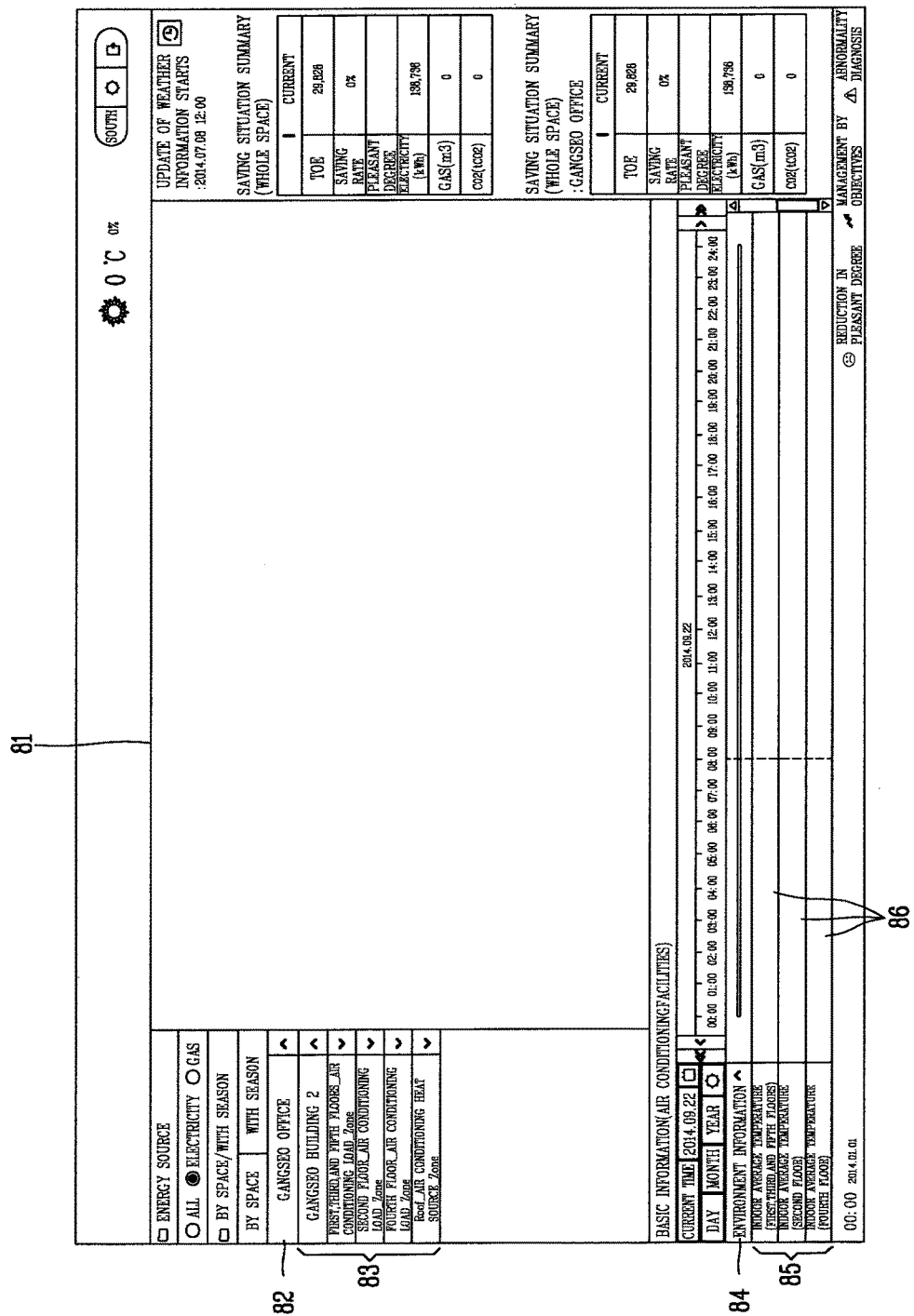
FIG. 9A is an illustration of a screen provided to select a control target to which a combination of at least one control scenario is applicable according to an exemplary embodiment of the present invention.

FIG. 9A is an illustration of a screen provided to select a control target to which a combination of at least one control scenario is applicable according to an exemplary embodiment of the present invention.

The user may select any one of a plurality of buildings as a target control area and select a certain space or floor of the selected building through at least one input button displayed on the screen.

In an example, buttons (e.g., combo boxes 82 and 83) for selecting a target control area are positioned in one area of the screen of FIG. 9A.

The user may choose a first button 82 to select a building named "Gangseo Building 2", and choose any one of a plurality of second buttons 83 shown under the selected building to select a target control area.

As described above, at least one facility or equipment may be selected from one target control area, and needless to say, any one of facilities or equipment set up on a selected space or floor may be selected. That is, the user may select or "Second Floor's Air-conditioning Load Zone" and select any one of a plurality of facilities set up in this zone.

Figure 9B:
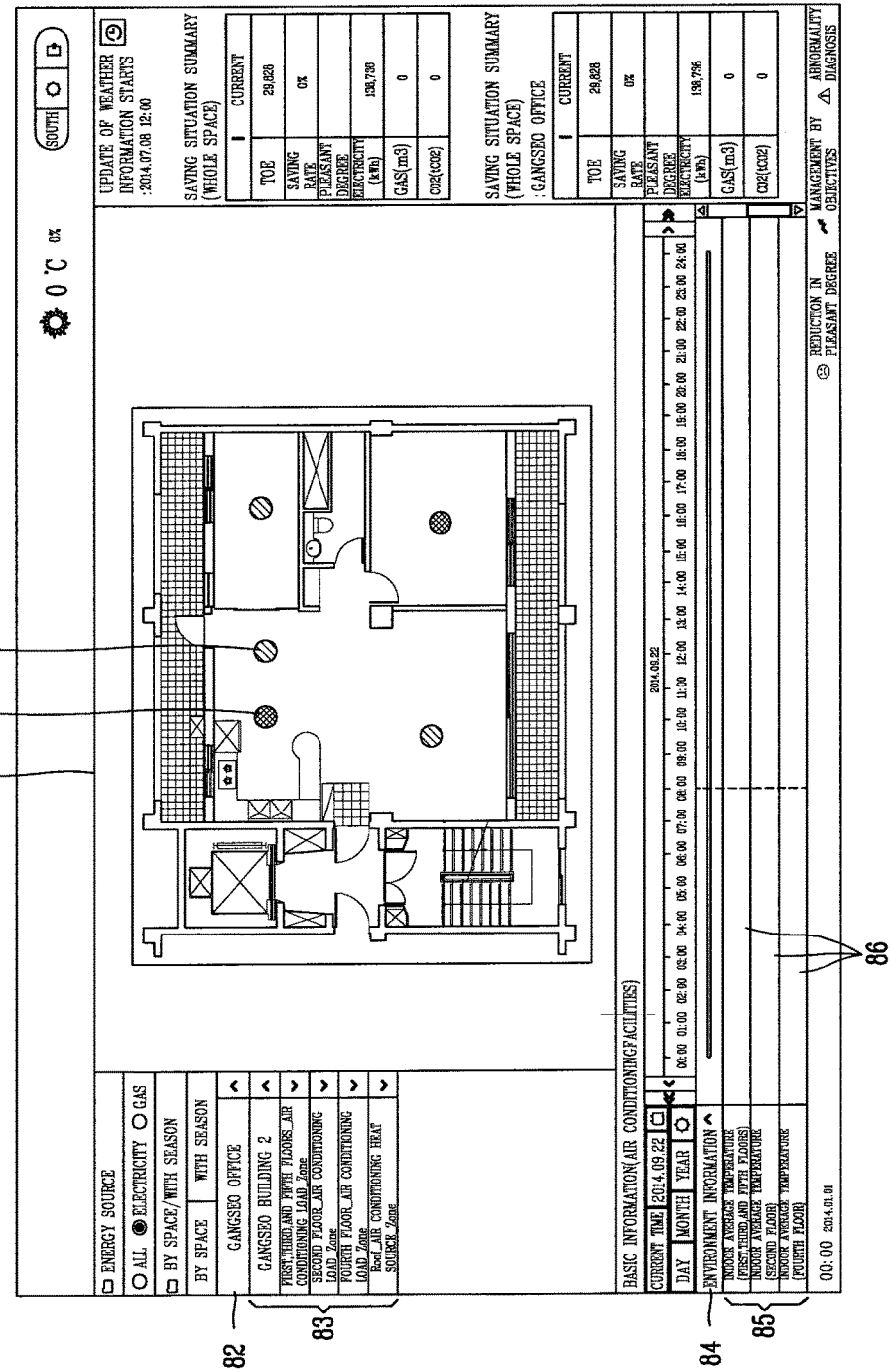
FIG. 9B is an illustration of a screen showing graphical objects of a target control area selected by the user and facilities set up in this area.

FIG. 9B is an illustration of a screen showing graphical objects of a target control area selected by the user and facilities set up in this area.

As shown in FIG. 9B, the display unit 140 may display graphical objects of facilities such as lighting, an indoor unit, etc. in a drawing of a certain space or floor selected by the user, in pop-up windows in some area of the screen.

Accordingly, the user may select at least one graphical object of a facility or equipment, and the controller may determine a combination of at least one control scenario for the at least one facility or equipment selected by the user, based on a set energy reduction rate, and also may control the corresponding facility or equipment according to the determined combination of control scenarios.

Since the display unit 140 display graphical objects of facilities or equipment in the drawing of the target control area, the user can easily identify the positions of the facilities or equipment subject to control, and unintended errors in the control of the facilities or equipment can be avoided.

Moreover, the display unit 140 may provide a drawing of a building so that the user selects a certain space or floor, or provide a map showing the locations of buildings so that the user selects a particular building.

Accordingly, according to an exemplary embodiment of the present invention, FIGS. 7A and 7B, which illustrate an example of a screen displayed in order for the controller 120 to receive an energy reduction rate for a control target selected through the input unit 110, may be output in one area of the screen indicated by reference numeral 81 of FIGS. 9A and 9B.

Meanwhile, as shown in FIGS. 9A and 9B, a graph of at least one among a baseline, predicted usage, and predicted environmental data about a target control area may be displayed for each target control area or for each of groups created according to certain criteria, and it is preferable that at least one graph to be displayed is positioned adjacent to one another so that the user can recognize the status of each target control area or each group the user wants to check at a glance.

In a concrete example, as shown in FIGS. 9A and 9B, if the input unit 110 receives user input for selecting "environmental information", a screen of various information (e.g., external temperature or humidity, internal temperature or humidity, etc.) that can be classified as environmental information may be provided to the user. Afterwards, if the input unit 110 receives input for selecting environmental information about each target control area, for example, "average indoor temperature (first, third, and fifth floors)", "average indoor temperature (second floor)", and "average indoor temperature (fourth floor)", from the user, it is preferable that status information (e.g., inside air temperature) for each selected target control area is output.

Meanwhile, as described above, the display unit 140 may display a combination of at least one control scenario determined by the control scenario determination module 125 based on an energy reduction rate input by the user. In this case, the input unit 110 may receive user input for modifying the determined combination of at least one control scenario.

Figure 8A:
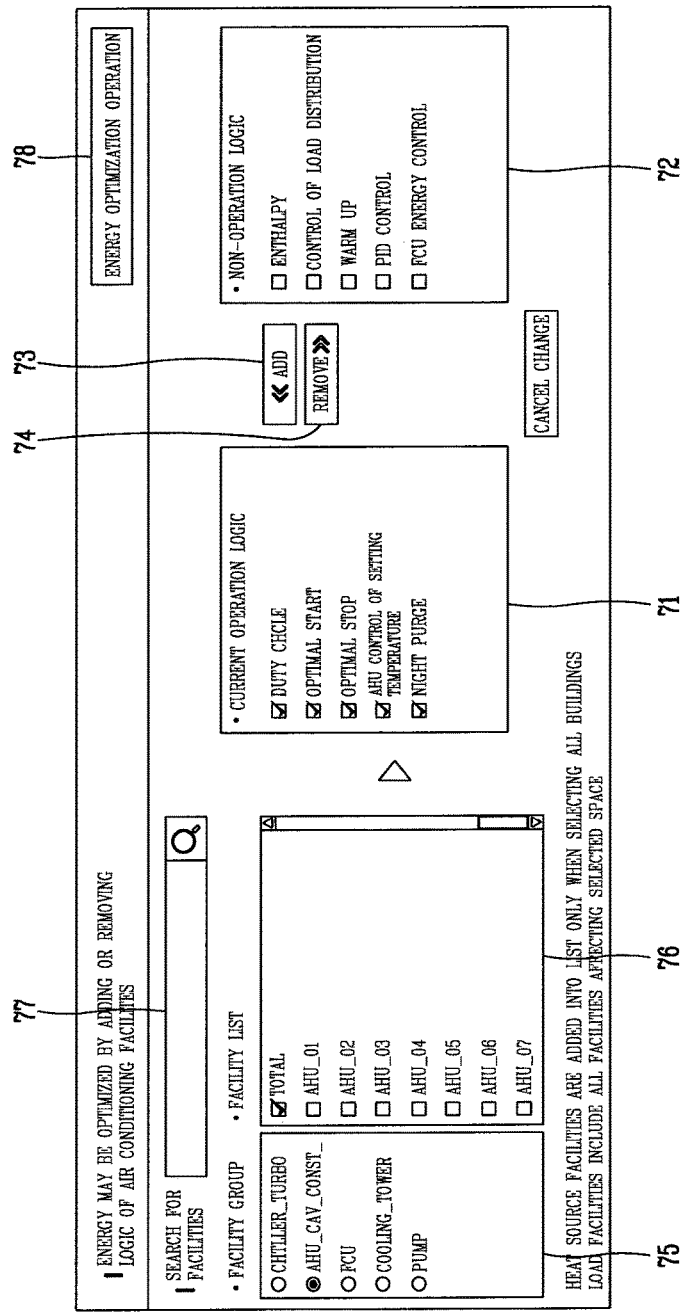
FIGS. 8A and 8B are views illustrating another example of a screen displayed by the central control apparatus according to an exemplary embodiment of the present invention.
Figure 8B:
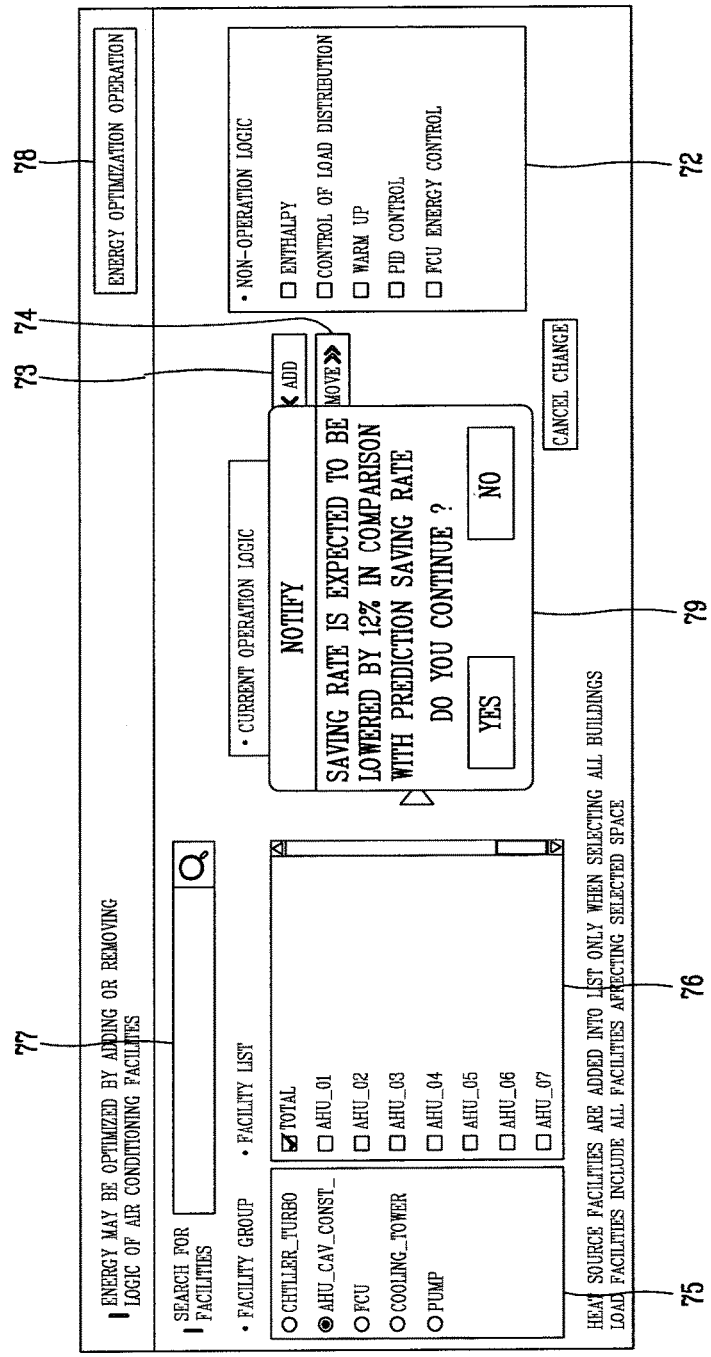

FIGS. 8A and 8B are views illustrating another example of a screen displayed by the central control apparatus according to an exemplary embodiment of the present invention.

That is, as shown in FIG. 8A, the display unit 140 may display a list of a combination of control scenarios determined by the control scenario determination module 125 in one area 71 of an output screen.

In an example, if the input unit 110 receives user input for setting an energy reduction rate, the control scenario determination module 125 may determine a combination of at least one control scenario based on the input energy reduction rate, and the display unit 140 may display control scenarios of "Duty Cycle", "Optimal Start", "Optimal Stop", "AHU setting temperature control", and "Night Purge" determined by the control scenario determination module 125 in the area of reference numeral 71.

Moreover, the display unit 140 may display at least one control scenario applicable to a facility or equipment to which energy-saving control is to be given, in another area 72 of the output screen.

That is, it is preferable that the controller 120, more specifically, the facility control logic module 1232, selects at least one control scenario applicable depending on the type of a facility or equipment to which energy-saving control is given, and outputs the selected at least one control scenario on the screen through the display unit 140.

By preventing any control scenario not applicable to the facility or equipment from being output on the screen, a user with little knowledge about the facility or equipment or a user with no knowledge about the control scenario can control the facility or equipment without errors.

Accordingly, the input unit 110 may receive user input for modifying the combination of at least one control scenario (hereinafter, abbreviated as "first control scenario list") currently determined by the control scenario determination module 125. That is, any one of at least one control scenario (hereinafter, abbreviated as "second control scenario list") applicable to a facility or equipment to which energy-saving control is to be given may be added to the first control scenario list, or at least one control scenario may be deleted from the first control scenario list.

Specifically, as shown in FIG. 8A, if the input unit 110 receives input for selecting "PID Control" shown in the area of reference numeral 72 and input for selecting the "Add" button 73, the controller 120 may add "PID Control" to the first control scenario list.

Afterwards, if the input unit 110 receives input for selecting the "Energy Optimization" button 78, the controller 120 may re-calculate energy reduction according to the first control scenario list with the "PID Control" control scenario added to it, and consequently perform energy-saving control over the corresponding facility or equipment.

In an example, the controller 120 may simulate the power consumption of a facility model operating according to the first control scenario list with the "PID Control" control scenario added to it, and display a graph of predicted usage or energy reduction over time on the screen, as shown in FIGS. 7A to 7D.

In another example, the controller 120 may control the real target facility simulated according to the first control scenario list with the "PID Control" control scenario added to it.

In this instance, the energy reduction calculation module 124 may calculate a first energy reduction according to the combination of control scenarios modified by user input, and the controller 120 may compare the first energy reduction with a second energy reduction, which is calculated prior to the modification according to the combination of at least one control scenario determined by the control scenario determination module 125, and, if the first energy reduction is larger than the second energy reduction, the controller 120 may output an alarm on the screen.

FIG. 8B is an illustration of a screen that appears if the first energy reduction is larger than the second energy reduction.

As shown in FIG. 8B, if the first energy reduction is larger than the second energy reduction, a message window 79 may be displayed on the screen to give a warning to the user.

In an example, if the combination of control scenarios modified by the user produces a lower energy reduction than the combination of at least one control scenario determined by the control scenario determination module 125, the user may be asked to reaffirm their intention of modifying the combination of control scenarios so that a user with little knowledge about the facility or equipment or a user with no knowledge about the control scenario can control the facility or equipment without errors.

In this case, the controller 120 may set a predetermined range so as to display a message window 79 on the screen if the difference between the first control scenario and the second control scenario is out of the predetermined range.

That is, even if the modified combination of control scenarios produces some decrease in energy reduction, priority is given to the user's intention in order so that control is performed according to the user's intention.

In an example, as shown in FIG. 8, a window warning that the first energy reduction according to the modified combination of control scenarios is expected to be 12% less than the second energy reduction according to the determined combination of control scenarios may be displayed on the screen, and at the same time the warning may be externally output visually or acoustically through a variety of messaging means.

Meanwhile, according to one exemplary embodiment of the present invention, at least one target control area may be selected from among a plurality of target control areas through the input unit 11, and the display unit 140 may display facility groups or facility lists included in the selected at least one target control area.

In this case, the display unit 140 may output the facility group included in the selected target control area in one area 75 of the screen, and if the input unit 110 receives user input for selecting any one of facility groups displayed on the screen, the facility or equipment list corresponding to the selected facility group may be displayed in one area 76 of the screen.

In an example, as shown in FIG. 8A, facility groups such as "CHILLER TURBO", "AHU CAV CONST", "FCU", "COOLING TOWER", and "PUMP", included in the input target control area may be displayed in one area 75 of the screen displayed by the display unit 140. If user input for selecting "AHU CAV CONST" from the facility groups output in the area of reference numeral 75 is received, the corresponding facility or equipment list including "AHU_01", "AHU_02", "AHU_03", "AHU_04", "AHU_5", "AHU_06", and "AHU_07" may be displayed in one area 76 of the screen.

Moreover, at least one facility or equipment subject to control may be selected from among a plurality of facilities (or equipment) through the input unit 110, and the display unit 140 may display on the screen at least one control scenario determined for the selected at least one facility or equipment.

In an example, as shown in FIG. 8A, a list of at least one control scenario for the selected at least one facility or equipment, determined by the control scenario determination module 125 based on a set energy reduction rate, may be displayed in one area 71 of the screen displayed by the display unit 140.

Also, as described above, a list of at least one control scenario applicable to the selected at least one facility or equipment may be displayed on the screen.

In an example, as shown in FIG. 8A, a list of at least one control scenario including "Enthalpy", "Load Distribution Control", "Warm Up", "PID Control", and FCU Energy Control", which is applicable to the selected at least one facility or equipment, may be displayed in one area 72 of the screen displayed by the display unit 140.

Meanwhile, according to another exemplary embodiment of the present invention, at least one among a facility or equipment's name, ID, type, and installation position may be used as a factor, and the controller 120 may display a facility or equipment list corresponding to the factor on the screen.

As shown in FIG. 8A, the input unit 110 may receive a keyword input from the user through a search window 77, and the controller 120 may extract at least one factor from the input keyword. Accordingly, based on this factor, the controller 120 may display at least one facility or equipment list corresponding to the factor from the facility or equipment list stored in the storage unit 130.

In an example, if "AHU" is input into the search window 77 by the user, the controller 120 may use "AHU" as a factor and display a facility or equipment list including "AHU_01", "AHU_02", "AHU_03" "AHU_04", "AHU_5", "AHU_06", and "AHU 07" in one area 76 of the screen.

Meanwhile, as described above, FIG. 9A is an illustration of a screen provided to select a control target to which a combination of at least one control scenario is applicable according to an exemplary embodiment of the present invention.

The user may select any one of a plurality of buildings as a target control area and select a certain space or floor of the selected building through at least one input button displayed on the screen.

In an example, buttons (e.g., combo boxes 82 and 83) for selecting a target control area are positioned in one area of the screen of FIG. 9A.

The user may choose a first button 82 to select a building named "Gangseo Building 2", and choose any one of a plurality of second buttons 83 shown under the selected building to select a target control area.

As described above, at least one facility or equipment may be selected from one target control area, and needless to say, any one of facilities or equipment set up on a selected space or floor may be selected. That is, the user may select "Second Floor's Air-conditioning Load Zone" and select any one of a plurality of facilities set up in this zone.

FIG. 9B is an illustration of a screen showing graphical objects of a target control area selected by the user and facilities set up in this area.

As shown in FIG. 9B, the display unit 140 may display graphical objects of facilities such as lighting, an indoor unit, etc. in a drawing of a certain space or floor selected by the user, in some area of the screen.

Accordingly, the user may select at least one graphical object of a facility or equipment, and a combination of at least one control scenario for the at least one facility or equipment selected by the user, determined by the controller 120, may be displayed on the screen.

In an example, upon receiving input for selecting a graphical object of an indoor unit 87 from the user, the display unit 140 may display on the screen a combination of at least one control scenario for the selected indoor unit 87, determined by the controller 120.

Since the display unit 140 display graphical objects of facilities or equipment in the drawing of the target control area, the user can easily identify the positions of the facilities or equipment subject to control, and unintended errors in the control of the facilities or equipment can be avoided.

Moreover, the display unit 140 may provide a drawing of a building so that the user selects a certain space or floor, or provide a map showing the locations of buildings so that the user selects a particular building.

Accordingly, according to an exemplary embodiment of the present invention, FIGS. 8A and 8B, which illustrate an example of a screen displayed to show and modify a combination of at least one control scenario for the facility or equipment, determined by the control scenario determination module 125, may be output in one area of the screen indicated by reference numeral 81 of FIGS. 9A and 9B.

Meanwhile, as shown in FIGS. 9A and 9B, a graph of at least one among a baseline, predicted usage, and predicted environmental data about a target control area may be displayed for each target control area or for each of groups created according to certain criteria, and it is preferable that at least one graph to be displayed is positioned adjacent to one another so that the user can recognize the status of each target control area or each group the user wants to check at a glance.

In a concrete example, as shown in FIGS. 9A and 9B, if the input unit 110 receives user input for selecting "environmental information", a screen of various information (e.g., external temperature or humidity, internal temperature or humidity, etc.) that can be classified as environmental information may be provided to the user. Afterwards, if the input unit 110 receives input for selecting environmental information about each target control area, for example, "average indoor temperature (first, third, and fifth floors)", "average indoor temperature (second floor)", and "average indoor temperature (fourth floor)", from the user, it is preferable that status information (e.g., inside air temperature) for each selected target control area is output.

Figure 10:
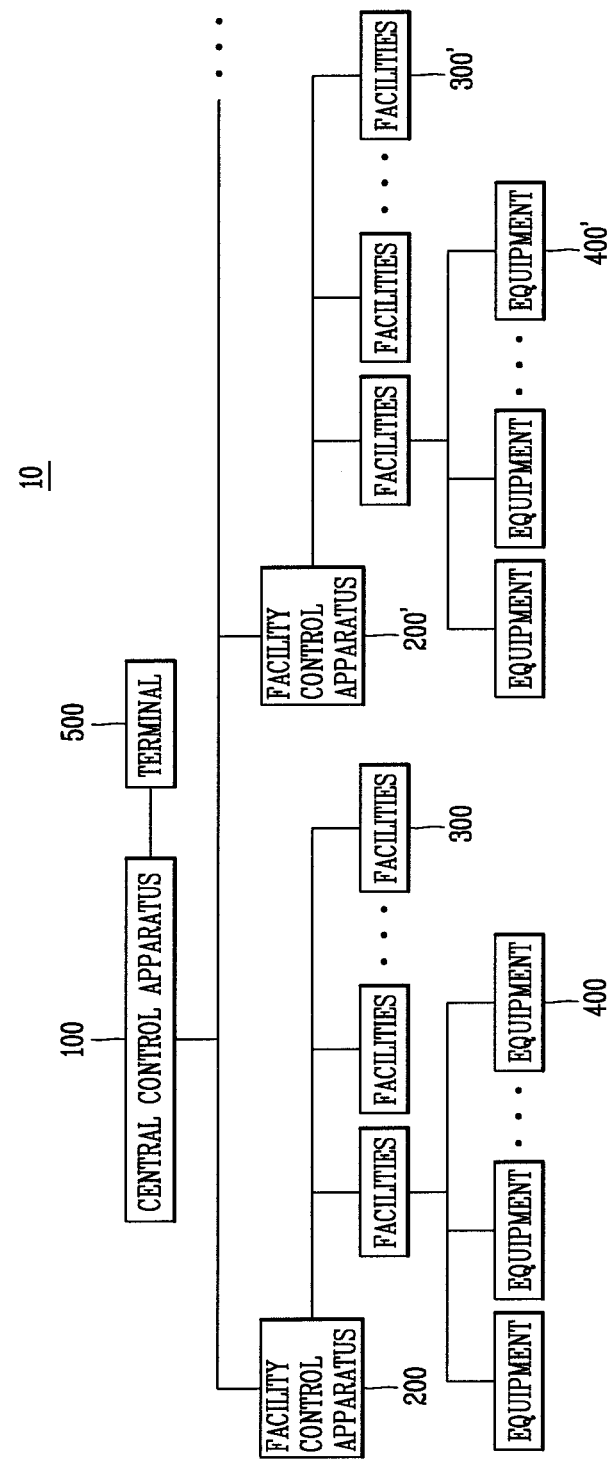
FIG. 10 is a block diagram of the configuration of a facility control system to which the central control apparatus and a terminal are connected according to an exemplary embodiment of the present invention.

Meanwhile, FIG. 10 is a block diagram of the configuration of a facility control system to which the central control apparatus and a terminal are connected according to an exemplary embodiment of the present invention.

As shown in FIG. 10, the central control apparatus 100 according to an exemplary embodiment of the present invention may be connected wirelessly or wired to an external terminal 500.

The external terminal 500 may display various information received from the central control apparatus 100 on the screen through a display means or receive various input from the user through an input means.

Accordingly, the central control apparatus 100 according to an exemplary embodiment of the present invention may be connected for communication with the external terminal 500 so that the central control apparatus 100 transmits predetermined information to the external terminal to allow the external terminal 500 to display a screen displayed by the display unit 140 of the central control apparatus 100.

In an example, screens corresponding to the screen of FIGS. 7A to 9B displayed by the display unit 140 may be displayed through the display means of the external terminal 500.

Moreover, the external terminal 500 may receive various input from the user through the input means, and transmit the information input by the user to the central control apparatus 100.

Accordingly, in the central control apparatus 100, the controller 129 may perform a predetermined process based on the information input through the external terminal 500 and display a processing result externally through the display unit 140 and/or the external terminal 500's display device.

In addition, the external terminal 500 may create a control command in response to user input and transmit it to the central control apparatus 100 so as to control the facility or equipment through the central control apparatus 100.

That is, since the external terminal 500 is able to perform the functions of the input unit 110 and display unit 140 of the central control apparatus 100, the user may input an energy reduction rate for a facility or equipment even from a remote location and perform the corresponding energy optimization control. Also, the same functions as those of the central control apparatus 100 according to an exemplary embodiment of the present invention, including modifying a combination of control scenarios determined based on the energy reduction rate, may be conducted from a remote location. Here, the functions performed by the central control apparatus 100 are the same as those mentioned above, and a detailed description thereof will be omitted.

Facility Control Method

Figure 11:
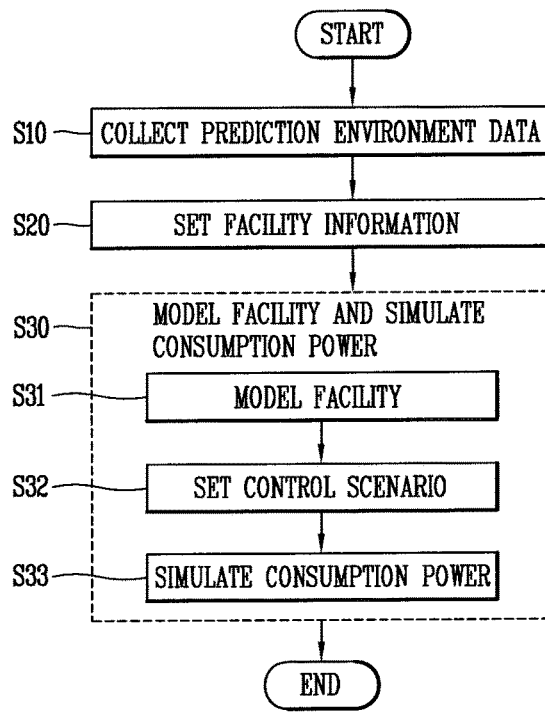
FIG. 11 is a flowchart showing in steps a facility control method according to an exemplary embodiment of the present invention.

FIG. 11 is a flowchart showing in steps a facility control method according to an exemplary embodiment of the present invention.

As shown in FIG. 11, the facility control method according to an exemplary embodiment of the present invention includes: the step S10 of collecting predicted environmental data about a target control area from a meteorological office server; the step S20 of setting information about at least one facility within the target control area; and the step S30 of modeling the facility based on the information about the facility and simulating the power consumption of the facility model operating according to a control scenario.

Hereinafter, this will be described in detail with reference to FIGS. 1 to 10. Repetitions will be replaced by the foregoing descriptions, and a detailed description thereof will be omitted.

First of all, in the predicted environmental data collection step S10, the controller 120, more specifically, the data collection module 121, may collect predicted environmental data including weather information about a target control area, or collect status information about a facility or equipment through control points.

In this case, the data collection module 121 may receive environmental data including various weather information such as temperature and humidity from a meteorological office server 30, predict environment data including weather information by various algorithms, or collect real-time environmental data for the current time and/or predicted environmental data for some future time by retrieving the environmental' data including weather information stored in the storage unit 130.

Afterwards, in the step S20 of setting information about at least one facility within the target control area, the system setting module 122 sets information about at least one facility within the target control area (S20).

The system setting module 122 provides the energy usage simulation module 123 with facility information input from the user or read out from various types of storage media.

The facility information is information required to model a facility, and may include the facility's specification such as the construction, capacity, type, etc. of the facility. Also, various types of facility information may further include information about the facility's connections with other facilities, such as the type, number, and combination of facilities connected to other facilities.

Accordingly, in the step S30 of modeling the facility and simulating the power consumption of the facility model, the energy usage simulation module 123 may model the facility based on the facility information and simulate the power consumption of the facility model according to a control scenario (S30).

The step S30 of modeling the facility and simulating the power consumption of the facility model may include: the step S31 of modeling the facility based on the information about the facility; the step S32 of setting at least one control scenario applicable to the facility; and the step S33 of simulating the power consumption of the facility model operating according to the set control scenario.

In the facility modeling step S31, the facility modeling module 1231 may model a facility based on facility information provided from the system setting module 122.

That is, the facility modeling module 1231 may model a facility by modeling individual components included in the facility based on facility information and modeling the rate of heat flowing in and out between the components (for example, the temperature, flow rate, etc. of a fluid moving between the components).

In the step S32 of setting at least one control scenario applicable to the facility, the system setting module 122 may provide the energy usage simulation module 123 with a control scenario for the facilities 300 and 300' or equipment 400 and 4000', in addition to the facility information.

In this case, the system setting module 122 may provide the energy usage simulation module 123 with a control scenario input from the user or read out from various types of storage media.

Herein, the control scenario may be a set of at least one control command having a sequence. That is, the control scenario is a set of control commands for controlling the facilities 300 and 300' or the equipment 400 and 400', concrete examples of which include optimum on/off control, temperature setting control, duty control, etc.

Accordingly, the facility control logic module 1232 may select at least one of a plurality of control scenarios provided from the system setting module 122, based on the facility modeled by the facility modeling module 1231, or select at least one of a plurality of control scenarios based on the facility's specification or the like provided by the system setting module 122.

The facility control logic module 1232 may select a control scenario applicable to a facility, i.e., a target whose power consumption is to be simulated, among a plurality of control scenarios provided from the system setting module 122.

Moreover, the facility control logic module 1232 may set at least one control scenario applicable to the facility and provide it to the energy usage prediction module 1233, in order that the energy usage prediction module 1233 calculates the amount of power consumed by the facility model operating according to a preset control scenario.

Also, in the step S33 of simulating the power consumption of the facility model operating according to the set control scenario, a facility modeled by the facility modeling module 1231 may be provided to the energy usage prediction module 1233, and the energy usage prediction module 1233 may simulate energy usage using the facility model.

That is, in the energy usage prediction module 1233, any one among facility type, facility capacity, facility's connections with other facilities, and operating condition may be an input parameter for the facility model, and the power consumption of the facility model may be an output parameter for the facility model.

The energy usage prediction module 1233's simulation time for the power consumption of the facility may be a preset time or a preset period. Preferably, 24 hours of predicted environmental data for the day may be received from the meteorological office server 30 at midnight (0:00 a.m.), and the power consumption of the facility model may be simulated using this data.

Meanwhile, in the power consumption simulation step S33, the controller 120 may calculate the relationship between at least one unit of prediction environmental data about a target control data and the amount of power consumed by the facility by using the facility model and the space load (or internal load).

Herein, the control scenario may be a set of at least one control command having a sequence for the facility so that the comfort level in the target control area is within a preset comfort level range.

In this instance, in the power consumption simulation step S33, when simulating the power consumption of the facility model, the energy usage prediction module 1233 may do the simulation by target control area or by time.

That is, if there is a plurality of target control areas, the controller 120 may calculate the relationship between the prediction environmental data and the power consumption for each of the target control areas.

Moreover, the power consumption of the facility at a specific time or for a specific period of time may be predicted by calculating the facility's power consumption by time.

Figure 12:
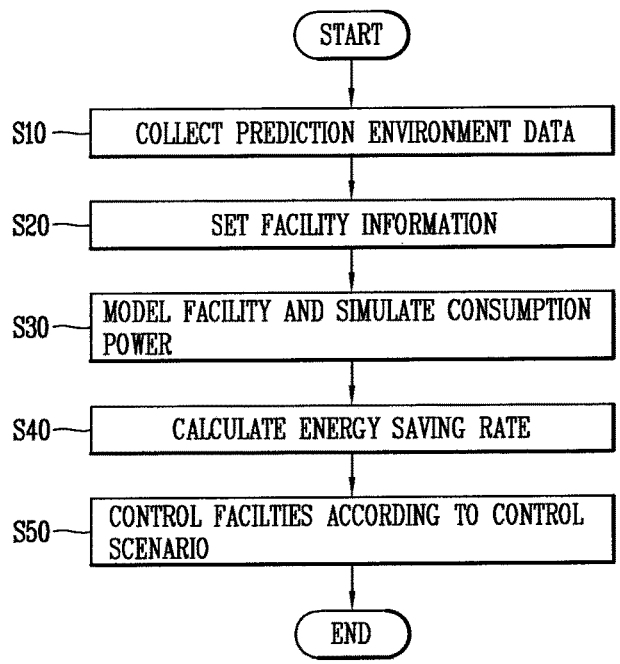
FIG. 12 is a flowchart showing in steps a facility control method according to another exemplary embodiment of the present invention.

FIG. 12 is a flowchart showing in steps a facility control method according to another exemplary embodiment of the present invention.

As shown in FIG. 12, the facility control method according to another exemplary embodiment of the present invention may further include the step S40 of calculating the energy reduction in the facility or target control area based on a simulation result of the power consumption of the facility model operating according to a combination of at least one control scenario.

In the step S40 of calculating the energy reduction in the target control area, the energy reduction calculation module 124 of the controller 120 may calculate the energy reduction in the facility or target control area based on a simulation result of the power consumption of the facility model operating according to a combination of at least one control scenario.

The energy reduction calculation module 124 may calculate energy reduction using the ratio of power consumption of the facility model operating according to a combination of at least one control scenario, calculated by the energy usage simulation module 123, with respect to a baseline.

Preferably, in the energy reduction calculation step S40, the energy reduction calculation module 124 may calculate the relationship between the energy reduction (or power consumption) in a facility or equipment and a combination of at least one control scenario.

According to an exemplary embodiment of the present invention, the relationship between energy reduction (or power consumption) and at least one corresponding combination of control scenarios may be calculated by calculating energy reduction with respect to energy usage calculated when a modeled facility or equipment operates according to every combination of at least one control scenario applicable to that facility or equipment.

Meanwhile, as shown in FIG. 12, the facility control method according to an exemplary embodiment of the present invention may further include the step S50 in which the controller 120 determines a combination of at least one control scenario for a facility or equipment based on the energy reduction by using the energy reduction calculation module, and controls the facility or equipment according to the determined combination of at least one control scenario.

Using the relationship between the energy reduction (or power consumption) in a facility or equipment calculated by the energy reduction calculation module 124 and a combination of at least one control scenario, the controller 120 may present the user a corresponding combination of at least one control scenario based on a preset energy reduction rate or an energy reduction rate input by the user and, moreover, control the operation of the corresponding facility or equipment according to a determined combination of at least one control scenario.

Therefore, according to one exemplary embodiment, the user may set a control scenario consisting of a combination of control commands for a facility or equipment subject to control. Also, even a user with little knowledge about the facility or equipment or a user with no knowledge about the control scenario may control the facility or equipment according to a determined combination of at least one control scenario, simply by setting an energy reduction rate.

Figure 13:
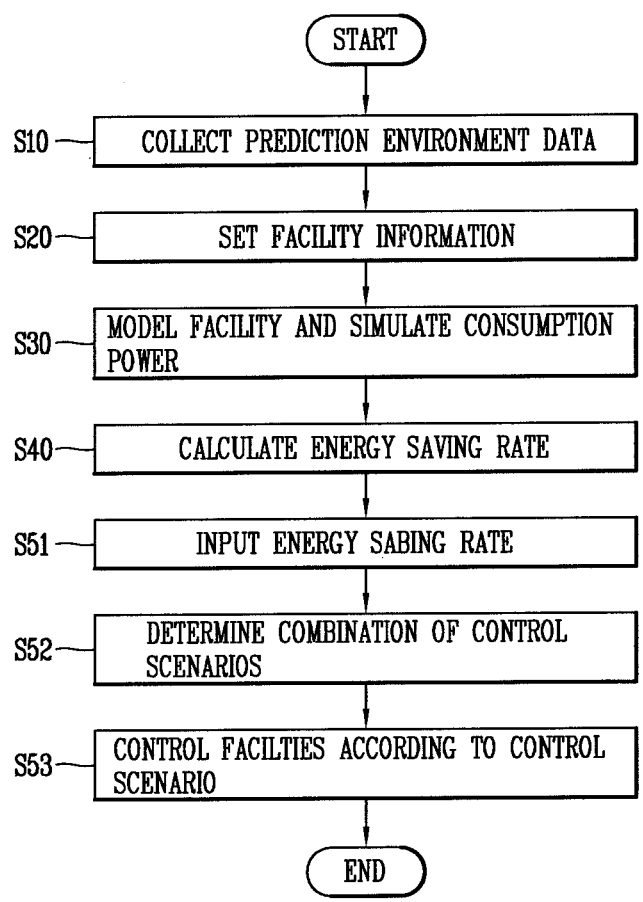
FIG. 13 is a flowchart showing in steps a facility control method according to yet another exemplary embodiment of the present invention.

FIG. 13 is a flowchart showing in steps a facility control method according to yet another exemplary embodiment of the present invention.

As shown in FIG. 13, the facility control method according to an exemplary embodiment of the present invention may further include the step S51 of receiving user input for setting an energy reduction rate, after the step S10 of collecting predicted environmental data, the step S20 of setting information about a facility, the step S30 of simulating the power consumption of the facility model, and the step S40 of calculating energy reduction.

In the step S51 of receiving input for setting an energy reduction rate, the input unit 110 may receive user input for setting an energy reduction rate from the user.

As shown in FIG. 7A, the central control apparatus according to an exemplary embodiment of the present invention may display a scroll bar 60a on the screen through the display unit 140, to receive input for setting an energy reduction rate, and the user may set an energy reduction rate by moving the scroll bar 60a displayed on the screen.

In this case, an energy reduction rate input by the user through the scroll bar 60a may be in the range between 0% and 100%, preferably, a preset energy reduction range.

Herein, the present energy reduction range may be a predetermined comfort level range. That is, when the user controls the energy reduction in a facility or equipment for air-conditioning a target control area, an energy reduction rate set by the scroll bar 60a may be limited to a comfort level range preset for the target control area.

Therefore, when a user with little knowledge about the facility or equipment or a user with no knowledge about the control scenario controls the facility or equipment, the energy reduction rate may be limited to prevent people in the target control area from feeling uncomfortable.

However, if the preset energy reduction range is a predetermined comfort level range, it is preferable that the preset energy reduction range is changed depending on the season, time, external or inside air temperature (or humidity), or external or internal load.

According to another exemplary embodiment of the present invention, as shown in FIG. 7B, the central control apparatus 100 may display an input window 60b on the screen to receive input for setting an energy reduction rate through the display unit 140. The user may give input for setting an energy reduction rate since the input unit 60b is configured to receive numerical input directly from the user or to increase or decrease the percentage in the input window 60b in preset increments or decrements by choosing the buttons (e.g., ▲/▼ buttons) at one side of the input window 60b.

According to yet another exemplary embodiment, the controller 120 may display a graph 65 of energy usage over time on the screen by using a simulation result of the power consumption of the facility model operating according to a combination of at least one control scenario that is determined based on an input percentage of energy increase or decrease according to the foregoing exemplary embodiment. In this instance, as shown in FIGS. 7A and 7B, input for setting an energy reduction rate may be received by the user's vertically moving the graph of energy usage over time, indicated by reference numeral 65.

That is, if the user moves the graph of reference numeral 65 in a vertical direction by drag & drop, the energy reduction rate may be set to a predetermined range depending on the position where the graph is moved.

Afterwards, the facility control method according to an exemplary embodiment of the present invention may further include the step S52 of receiving input for setting an energy reduction rate from the user and determining a combination of at least one control scenario based on the energy reduction rate input by the user.

The controller 120, more specifically, the control scenario determination module 125, may determine a combination of at least one control scenario based on an energy reduction rate set by the user.

Afterwards, the facility control method according to an exemplary embodiment of the present invention may further include the step S53 of determining a combination of at least one control scenario based on an energy reduction rate input by the user and controlling the facility according to the combination of at least one control scenario determined in the control scenario determination step S52.

Moreover, the facility control method according to an exemplary embodiment of the present invention may further include the step (not shown) of displaying the combination of at least one control scenario determined in the control scenario determination step on the screen through a display unit.

As shown in FIG. 7C, the display unit 140 may display a message window 69a showing a combination of at least one control scenario determined based on an energy reduction rate input by the user by means of the controller 120, more specifically, the control scenario determination module 125.

The display unit 140 may display on the screen the combination of at least one control scenario determined based on the energy reduction rate input by the user to let the user know according to which control scenario the corresponding facility or equipment operates.

Figure 14:
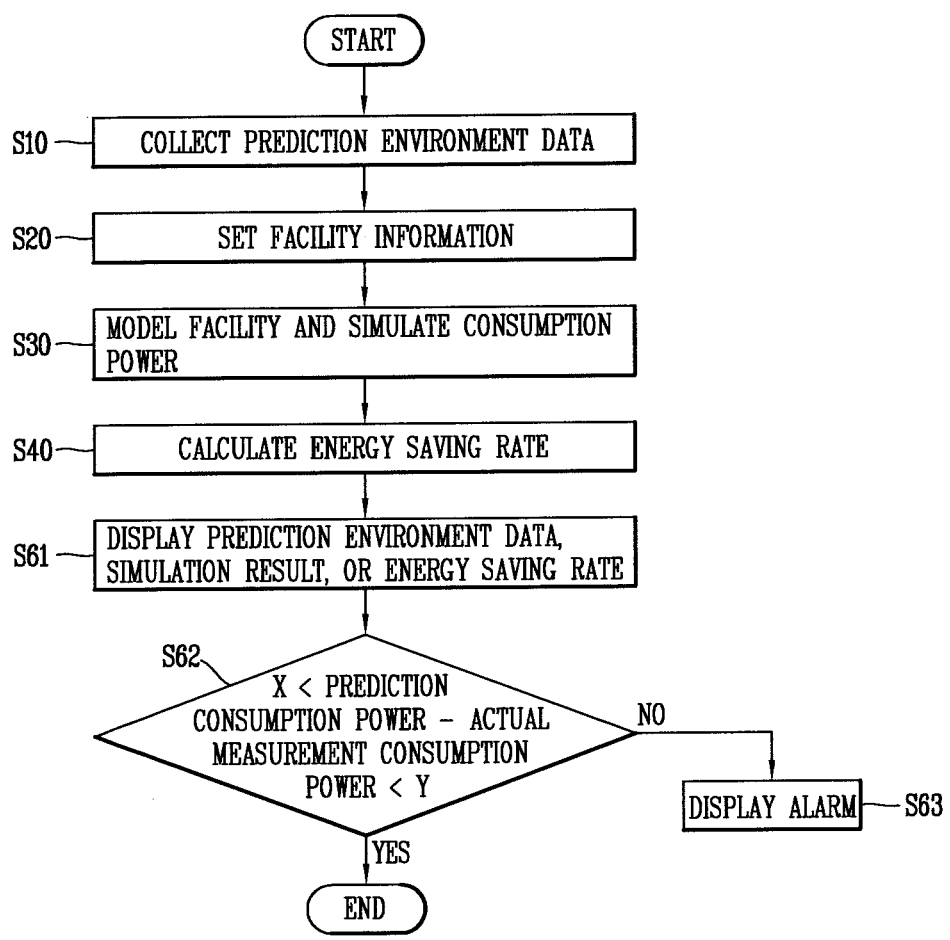
FIG. 14 is a flowchart showing in steps a facility control method according to a further exemplary embodiment of the present invention.
Figure 15:
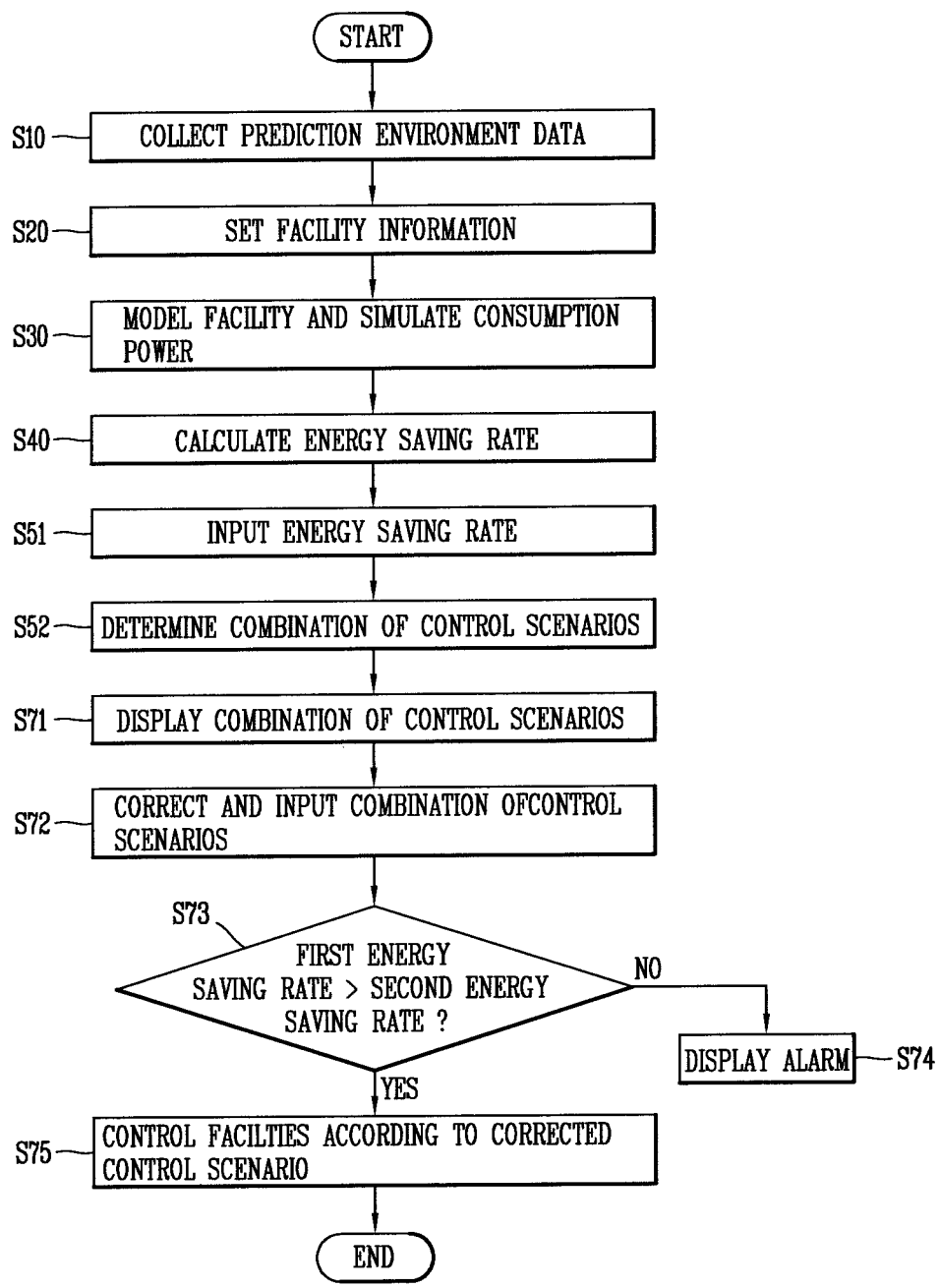
FIG. 15 is a flowchart showing in steps a facility control method according to a further exemplary embodiment of the present invention.

Meanwhile, as shown in FIG. 14, the facility control method according to an exemplary embodiment of the present invention may further include the step S61 of displaying a graphical object representing a simulation result of the power consumption of the facility model over time, the predicted environmental data, or the reduction on the screen, after the step S40 of calculating the energy reduction.

The display unit 140 may display a graph 63 of at least either predicted environmental data (e.g., outside air temperature or humidity, inside air temperature or humidity, and so on) about the target control area, received from the meteorological office server 30 through a baseline 64 and the communication unit 150, or predicted usage on the screen with respect to time.

Also, the controller 120 may calculate the comfort level with respect to time according to a predetermined standard such as PMV or PPD as described above, by using the predicted environmental data received from the meteorological office server 30, and display a graphical object of the calculated comfort level on the screen according to a predetermined comfort level range.

In an example, as shown in FIGS. 7A and 7B, an outside air temperature of the target control area, a baseline, and predicted usage indicative of a simulation result of the power consumption of a facility model operating according to a combination of at least one control scenario may be shown on the screen.

In this case, it is preferable that the display unit 140 displays a graph in two distinct domains (P and F domains) on the screen, marked off by the present time, as shown in FIGS. 7A and 7B.

That is, according to an exemplary embodiment of the present invention, the display unit 140 may display, in the time domain (F domain) after the present time on the screen, a graph of at least one among a baseline, predicted usage indicative of a simulation result of the power consumption of a facility model operating according to the combination of at least one control scenario, and predicted environmental data about a target control area, and may update and display the baseline, the predicted usage, and the status information in the time domain (P domain) before the present time as time passes after the present time.

Specifically, the predicted environmental data shown in the time domain (P domain) before the present time may be displayed as an updated graph by using the facility or equipment's status information collected through control points by the data collection module 121.

Also, the predicted usage may be shown in such a manner that the controller 120, more specifically, the energy usage simulation module 123, simulates the power consumption of the facility model based on environmental data collected at a certain time or for a certain period of time by the data collection module 121, and a graph of predicted usage already output in the time domain (P domain) before the present time may be updated and displayed.

Also, a graph of predicted environmental data in the time domain (F domain) after the present time also may be updated and displayed using predicted environmental data (e.g., outside air temperature or humidity, inside air temperature or humidity, and so on) about the target control area, received in real time or at preset time intervals from the meteorological office server 30 through the communication unit 150.

Meanwhile, it is preferable that the controller 120 receives the actual power consumption of a target facility whose predicted usage has been simulated, from the data collection module 121 through control points and displays various types of graphs of actual power consumption 66 and 67 on the screen.

In an example, as shown in FIGS. 7A and 7B, a bar graph of the actual power consumption of the target facility whose predicted usage has been simulated at predetermined time intervals (e.g., every hour) may be displayed on the screen.

In an example, however, if the user forces a facility or equipment to operate at their discretion, or in case of a failure in at least one among the facility or equipment, the facility control apparatus, and the central control apparatus, the actual power consumption 67 may exceed predicted usage indicative of a simulation result of the power consumption of the facility model according to a combination of at least one control scenario.

Accordingly, the facility control method according to an exemplary embodiment of the present invention may further include: the step S61 of determining if the difference between the actual power consumption and the predicted usage is out of a preset range; and the step S63 of outputting an alarm on the screen if the difference between the actual power consumption and the predicted usage is out of a preset range.

As shown in FIG. 7D, if the difference between the actual power consumption and the predicted usage is out of, a preset range, a message window 69b may appear on the screen to give a warning to the user.

The preset range may be arbitrarily set by the user, preferably, greater than a range of error between the predicted usage and the actual power consumption.

Meanwhile, the facility control method according to an exemplary embodiment of the present invention may further include: the step of receiving input for selecting at least one target control area from among a plurality of target control areas through the input unit 110, and the step in which the display unit 140 displays the predicted usage or energy reduction rate for a facility included in this target control area on the screen based on the selected at least one target control area.

According to another exemplary embodiment of the present invention, the facility control method may further include the step (not shown) of receiving input for selecting at least one facility or equipment subject to control from among a plurality of facilities or equipment through the input unit 110; and the step (not shown) in which the display unit 140 displays the predicted usage or energy reduction rate for the selected at least one facility or equipment on the screen.

The user may select facilities or equipment according to target control areas or according to groups created according to certain criteria, and the predicted usage or energy reduction rate for the facilities or equipment included in the selected target control area or selected group may be displayed on the screen.

Accordingly, a combination of at least one control scenario may be determined for at least one facility or equipment selected according to target control areas or groups, based on an energy reduction rate input by the user, and the corresponding facility or equipment may be controlled according to the determined combination of control scenarios.

Therefore, the user may perform energy-saving control with ease according to target control areas or according to groups.

Moreover, the facility control method according to an exemplary embodiment of the present invention may further include the step S71 of displaying the combination of at least one control scenario determined in the control scenario determination step on the screen through a display unit, after the control scenario determination step S52.

Also, the facility control method according to an exemplary embodiment of the present invention may further include the step S72 of receiving user input for modifying the determined combination of at least one control scenario.

As shown in FIG. 8A, the display unit 140 may display a list of a combination of control scenarios determined by the control scenario determination module 125 in one area 71 of an output screen.

Moreover, the display unit 140 may display at least one control scenario applicable to a facility or equipment to which energy-saving control is to be given, in another area 72 of the output screen.

That is, it is preferable that the controller 120, more specifically, the facility control logic module 1232, selects at least one control scenario applicable depending on the type of a facility or equipment to which energy-saving control is given, and outputs the selected at least one control scenario on the screen through the display unit 140.

By preventing any control scenario not applicable to the facility or equipment from being output on the screen, a user with little knowledge about the facility or equipment or a user with no knowledge about the control scenario can control the facility or equipment without errors.

Accordingly, the input unit 110 may receive user input for modifying a first control scenario list currently determined by the control scenario determination module 125. That is, any one control scenario of a second control scenario list applicable to a facility or equipment to which energy-saving control is to be given may be added to the first control scenario list, or at least one control scenario may be deleted from the first control scenario list.

In this instance, the facility control method according to an exemplary embodiment of the present invention may further include: the step S73 in which the energy reduction calculation module 124 calculates a first energy reduction according to the combination of control scenarios modified by user input and the controller 120 compares the first energy reduction with a second energy reduction, which is calculated prior to the modification according to the combination of at least one control scenario determined by the control scenario determination module 125; and the step S74 in which, if the first energy reduction is larger than the second energy reduction, the controller 120 outputs an alarm on the screen.

As shown in FIG. 8B, if the first energy reduction is larger than the second energy reduction, a message window 79 may be displayed on the screen to give a warning to the user.

In an example, if the combination of control scenarios modified by the user produces a lower energy reduction than the combination of at least one control scenario determined by the control scenario determination module 125, the user may be asked to reaffirm their intention of modifying the combination of control scenarios so that a user with little knowledge about the facility or equipment or a user with no knowledge about the control scenario can control the facility or equipment without errors.

In this case, the controller 120 may set a predetermined range so as to display a message window 79 on the screen if the difference between the first control scenario and the second control scenario is out of the predetermined range.

That is, even if the modified combination of control scenarios produces some decrease in energy reduction, priority is given to the user's intention in order so that control is performed according to the user's intention.

Meanwhile, in the step S72 of receiving user input for modifying the determined combination of at least one control scenario, in the facility control method according to one exemplary embodiment of the present invention, at least one target control area may be selected from among a plurality of target control areas through the input unit 11, and the display unit 140 may display facility groups or facility lists included in the selected at least one target control area.

In this case, the display unit 140 may output the facility group included in the selected target control area in one area 75 of the screen, and if the input unit 110 receives user input for selecting any one of facility groups displayed on the screen, a facility or equipment list corresponding to the selected facility group may be displayed in one area 76 of the screen.

Moreover, at least one facility or equipment subject to control may be selected from among a plurality of facilities (or equipment) through the input unit 110, and the display unit 140 may display on the screen at least one control scenario determined for the selected at least one facility or equipment.

In an example, as shown in FIG. 8A, a list of at least one control scenario for the selected at least one facility or equipment, determined by the control scenario determination module 125 based on a set energy reduction rate, may be displayed in one area 71 of the screen displayed by the display unit 140.

Also, as described above, a list of at least one control scenario applicable to the selected at least one facility or equipment may be displayed on the screen.

Meanwhile, according to another exemplary embodiment of the present invention, at least one among a facility or equipment's name, ID, type, and installation position may be used as a factor, and the controller 120 may display a facility or equipment list corresponding to the factor on the screen.

As shown in FIG. 8A, the input unit 110 may receive a keyword input from the user through a search window 77, and the controller 120 may extract at least one factor from the input keyword. Accordingly, based on this factor, the controller 120 may display at least one facility or equipment list corresponding to the factor from the facility or equipment list stored in the storage unit 130.

Meanwhile, the user may select any one of a plurality of buildings as a target control area and select a certain space or floor of the selected building through at least one input button displayed on the screen.

In an example, buttons (e.g., combo boxes 82 and 83) for selecting a target control area are positioned in one area of the screen of FIG. 9A.

The user may choose a first button 82 to select a building named "Gangseo Building 2", and choose any one of a plurality of second buttons 83 shown under the selected building to select a target control area.

As described above, at least one facility or equipment may be selected from one target control area, and needless to say, any one of facilities or equipment set up on a selected space or floor may be selected. That is, the user may select "Second Floor's Air-conditioning Load Zone" and select any one of a plurality of facilities set up in this zone.

Herein, as shown in FIG. 9B, the display unit 140 may display graphical objects of facilities such as lighting, an indoor unit, etc. in a drawing of a certain space or floor selected by the user, in some area of the screen.

Accordingly, the user may select at least one graphical object of a facility or equipment, and a combination of at least one control scenario for the at least one facility or equipment selected by the user, determined by the controller 120, may be displayed on the screen.

Since the display unit 140 display graphical objects of facilities or equipment in the drawing of the target control area, the user can easily identify the positions of the facilities or equipment subject to control, and unintended errors in the control of the facilities or equipment can be avoided.

Moreover, the display unit 140 may provide a drawing of a building so that the user selects a certain space or floor, or provide a map showing the locations of buildings so that the user selects a particular building.

Accordingly, according to an exemplary embodiment of the present invention, FIGS. 8A and 8B, which illustrate an example of a screen displayed to show and modify a combination of at least one control scenario for the facility or equipment, determined by the control scenario determination module 125, may be output in one area of the screen indicated by reference numeral 81 of FIGS. 9A and 9B.

Meanwhile, as shown in FIGS. 9A and 9B, a graph of at least one among a baseline, predicted usage, and predicted environmental data about a target control area may be displayed for each target control area or for each of groups created according to certain criteria, and it is preferable that at least one graph to be displayed is positioned adjacent to one another so that the user can recognize the status of each target control area or each group the user wants to check at a glance.

Meanwhile, the facility control method according to an exemplary embodiment of the present invention may further include the step S75 of controlling the facility according to the modified combination of control scenarios once a combination of at least one control scenario is determined based on an energy reduction rate input by the user (S52) and the determined combination of at least one control scenario is modified (S72).

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The present invention has been made in an effort to solve the aforementioned problems, and an aspect of the present invention is to provide a central control apparatus capable of simulating the power consumption of facilities or equipment subject to control, a facility control system comprising the same, and a facility control method.

The present invention provides a central control apparatus including: a controller that performs control over facilities or equipment; a display unit that displays information processed by the controller on the screen; and an input unit that receives user input, wherein the input unit receives user input for setting an energy reduction rate, and the controller includes: a data collection module that collects predicted environmental data including weather information about a target control area; a system setting module that sets information about at least one facility within the target control area; and an energy usage simulation module that models the facility based on based on the facility information and simulates the power consumption of the facility model according to a control scenario, the energy usage simulation module including: an energy reduction calculation module for calculating the energy reduction of the facility or target control area based on a simulation result of the power consumption of the facility model according to a combination of at least one control scenario; and a control scenario determination module for determining a combination of at least one control scenario based on the energy reduction rate input through the input unit by using the energy reduction calculation module.

According to an exemplary embodiment of the present invention, the display unit may display on the screen the combination of at least one control scenario determined by the control scenario determination module.

According to an exemplary embodiment of the present invention, the input unit may receive user input for modifying the determined combination of at least one control scenario.

According to an exemplary embodiment of the present invention, the display unit may display on the screen at least one control scenario list applicable to at least one facility selected from a facility list included in the target control area.

According to an exemplary embodiment of the present invention, the display unit may display on the screen at least one facility list included in at least one target control area selected from among a plurality of target control areas through the input unit.

According to an exemplary embodiment of the present invention, the energy reduction calculation module may calculate a first energy reduction according to the modified combination of control scenarios modified, and the controller may compare the first energy reduction with a second energy reduction, which is calculated prior to the modification according to the combination of at least one control scenario, and output an alarm on the screen if the first energy reduction is larger than the second energy reduction.

According to an exemplary embodiment of the present invention, the controller may control the facility according to the modified combination of at least one control scenario.

According to an exemplary embodiment of the present invention, the display unit may display a graphical object representing a simulation result of the power consumption of the facility model over time, the predicted environmental data, or the reduction on the screen.

According to an exemplary embodiment of the present invention, the display unit may display the actual power consumption of the facility in the time domain before the present time and the power consumption of the facility model in the time domain after the present time, or may display status information collected by the data collection module through control points in the time domain before the present time and the predicted environmental data in the time domain after the present time.

According to an exemplary embodiment of the present invention, the display unit may arrange and display graphical objects of the plurality of target control areas on the screen.

According to an exemplary embodiment of the present invention, the central control apparatus may further include a communication unit for communicating with a meteorological office server, wherein the data collection module may collect predicted environmental data including weather information about the target control area from the meteorological office server through the communication unit.

The present invention provides a facility control system.

The present invention provides a facility control method including the steps of: collecting predicted environmental data about a target control area from a meteorological office server; setting information about at least one facility within the target control area; modeling the facility based on the information about the facility and simulating the power consumption of the facility model operating according to a control scenario; calculating the energy reduction in the facility or target control area based on a simulation result of the power consumption of the facility model operating according to a combination of at least one control scenario; and determining a combination of at least one control scenario based on an energy reduction rate input by the user.

According to an exemplary embodiment of the present invention, the facility control method may further include the step of displaying the combination of at least one control scenario determined in the control scenario determination step on the screen through a display unit.

According to an exemplary embodiment of the present invention, the facility control method may further include the step of receiving user input for modifying the determined combination of at least one control scenario.

According to an exemplary embodiment of the present invention, the facility control method may further include the step of controlling the facility according to the modified combination of control scenario.

According to an exemplary embodiment of the present invention, in the step of receiving user input for modifying the determined combination of at least one control scenario, at least one control scenario list applicable to at least one facility selected from a facility list included in the target control area may be displayed on the screen.

According to an exemplary embodiment of the present invention, in the step of receiving user input for modifying the determined combination of at least one control scenario, at least one facility list included in at least one target control area selected from among a plurality of target control areas through the input unit may be displayed on the screen.

According to an exemplary embodiment of the present invention, the facility control method may further include the steps of calculating a first energy reduction according to the modified combination of control scenarios modified; comparing the first energy reduction with a second energy reduction, which is calculated prior to the modification according to the combination of at least one control scenario; and outputting an alarm on the screen if the first energy reduction is larger than the second energy reduction.

According to an exemplary embodiment of the present invention, the facility control method may further include the step of displaying a graphical object representing a simulation result of the power consumption of the facility model over time, the predicted environmental data, or the reduction on the screen.

According to an exemplary embodiment of the present invention, in the screen display step, the actual power consumption of the facility may be displayed in the time domain before the present time and the power consumption of the facility model may be displayed in the time domain after the present time, or status information collected by the data collection module through control points may be displayed in the time domain before the present time and the predicted environmental data may be displayed in the time domain after the present time.

According to an exemplary embodiment of the present invention, in the screen display step, graphical objects of the plurality of target control areas may be arranged and displayed on the screen.

According to an exemplary embodiment of the present invention, in the predicted environmental data collection step, predicted environmental data including weather information about the target control area may be collected from the meteorological office server.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control apparatus comprising:
a controller to control facilities or equipment;
a display device to display information on a screen; and
an input device to receive user input,
wherein the input device to receive user input for setting an energy reduction rate, and
the controller includes a control program and when executed:
collecting data to obtain predicted environmental data including weather information regarding a target control area about the control facilities or equipment;
setting information based on the collected data regarding at least one facility within the target control area; and
simulating energy usage to generate a facility model based on the collected data of the at least one facility information and simulating power consumption of the facility model according to a control scenario, the simulating energy usage including:

an energy reduction calculation to determine energy reduction of the facility or the target control area based on a simulation result of the power consumption of the facility model according to a combination of at least one control scenario, and
a control scenario determination to determine the combination of the at least one control scenario based on the energy reduction rate, input at the input device, by using the energy reduction calculation, wherein the combination of the at least one control scenarios includes "Duty Cycle", "Optimal Start", "Optimal Stop", "AHU setting temperature control", and "Night Purge" of the control facility or equipment,
wherein the display device to display, at the screen, the combination of the at least one control scenario determined by the control scenario determination,
wherein the input device to receive user input for modifying the determined combination of the at least one control scenario,
wherein the controller sets a predetermined range so as to display a message window on the screen if a difference between modified control scenario and original control scenario is out of the predetermined range,
wherein the display device to display, on the screen, a graphical object to represent a stimulation result of the power consumption of the facility model over time, the predicted environmental data, or the energy reduction,
wherein the display device to display actual power consumption of the facility in a time domain before a present time and the power consumption of the facility model in the time domain after the present time, or the display device to display status information obtained by the collected data through control points in the time domain before the present time and the predicted environmental data in the time domain after the present time.

2. The control apparatus of claim 1, wherein the display device to display, at the screen, at least one control scenario list applicable to at least one facility, selected from a facility list included in the target control area.

3. The control apparatus of claim 2, wherein the display device to display, at the screen, at least one facility list included in at least one target control area selected from a plurality of target control areas, based on input at the input device.

4. The control apparatus of claim 1, wherein the simulating energy usage to determine a first energy reduction according to the modified combination of control scenarios, and the controller to compare the first energy reduction with a second energy reduction, determined prior to the modification according to the combination of at least one control scenario, and
the controller to control the display device to output alarm information on the screen when the first energy reduction is determined to be larger than the second energy reduction.

5. The control apparatus of claim 1, wherein the controller to control the facility according to the modified combination of the at least one control scenario.

6. The control apparatus of claim 1, wherein the display device to display, on the screen, graphical objects of the plurality of target control areas.

7. The control apparatus of claim 1, further comprising a communication device to communicate with a meteorological server, wherein the collecting data obtains predicted environmental data, including weather information regarding the target control area, from the meteorological server by using the communication device.

8. The control apparatus of claim 1, further comprising in a facility control system comprising a central control apparatus.

9. A facility control method comprising:
collecting data and obtaining, from a meteorological server, predicted environmental data regarding a target control area;
setting information based on the collected data regarding at least one facility within the target control area;
simulating energy usage to generate a facility model based on the collected data of the at least one facility information regarding the facility and simulating power consumption of the facility model according to a control scenario;
determining an energy reduction in the facility or the target control area based on a simulation result related to the power consumption of the facility model according to a combination of at least one control scenario;
determining the combination of the at least one control scenario based on an energy reduction rate input by a user, by using the determined energy reduction, wherein the combination of the at least one control scenarios includes "Duty Cycle", "Optimal Start", "Optimal Stop", "AHU setting temperature control", and "Night Purge" of the control facility or equipment;
displaying, on a screen of a display device, the determined combination of the at least one control scenario;
receiving user input for modifying the determined combination of the at least one control scenario;
displaying a message window on the screen if a difference between modified control scenario and original control scenario is out of a predetermined range;
displaying, on the screen, a graphical object to represent a stimulation result of the power consumption of the facility model over time, the predicted environmental data, or the energy reductions; and
displaying actual power consumption of the facility in a time domain before a present time and the power consumption of the facility model in the time domain after the present time, or displaying status information obtained by the collected data through control points in the time domain before the present time and the predicted environmental data in the time domain after the present time.

10. The facility control method of claim 9, further comprising controlling the facility according to the modified combination of the at least one control scenario.

11. The facility control method of claim 9, wherein receiving the user input includes displaying, on the screen, at least one control scenario list applicable to at least one facility selected from a facility list included in the target control area.

12. The facility control method of claim 9, wherein receiving the user input includes displaying, on the screen, at least one facility list included in at least one target control area selected from among a plurality of target control areas, based on input at an input device.

13. The facility control method of claim 9, further comprising:
determining a first energy reduction according to the modified combination of the at least one control scenario;
comparing the first energy reduction with a second energy reduction, determined prior to the modification according to the combination of the at least one control scenario; and
outputting alarm information on the screen when the first energy reduction is determined to be larger than the second energy reduction.

* * * * *